US008385041B2

United States Patent
Goudy, Jr.

(10) Patent No.: US 8,385,041 B2
(45) Date of Patent: Feb. 26, 2013

(54) HONEYCOMB STRUCTURE AND METHOD OF USING THE STRUCTURE

(75) Inventor: Paul R. Goudy, Jr., Bayside, WI (US)

(73) Assignee: Goudy Research, LLC, Waukesha, WI (US)

( * ) Notice: Subject to any disclaimer, the term of this patent is extended or adjusted under 35 U.S.C. 154(b) by 434 days.

(21) Appl. No.: 12/524,428

(22) PCT Filed: Jan. 25, 2008

(86) PCT No.: PCT/US2008/052069
§ 371 (c)(1),
(2), (4) Date: Jan. 12, 2010

(87) PCT Pub. No.: WO2008/092089
PCT Pub. Date: Jul. 31, 2008

(65) Prior Publication Data
US 2010/0147676 A1    Jun. 17, 2010

Related U.S. Application Data

(60) Provisional application No. 60/886,620, filed on Jan. 25, 2007.

(51) Int. Cl.
*H01T 23/00* (2006.01)
(52) U.S. Cl. ...................................... 361/230
(58) Field of Classification Search .................. 361/230
See application file for complete search history.

(56) References Cited

U.S. PATENT DOCUMENTS

| 5,009,763 | A | 4/1991 | Hise |
| 5,108,470 | A | 4/1992 | Pick |
| 6,767,434 | B1 * | 7/2004 | Imanishi et al. ............. 204/164 |
| 2001/0043890 | A1 | 11/2001 | Son |
| 2003/0030374 | A1 | 2/2003 | Pai |
| 2005/0063879 | A1 | 3/2005 | Tsuji |
| 2005/0142047 | A1 | 6/2005 | Baik et al. |
| 2005/0142407 | A1 | 6/2005 | Fuller et al. |
| 2005/0270722 | A1 | 12/2005 | Gorczyca et al. |
| 2006/0127270 | A1 | 6/2006 | Deshpande |
| 2010/0067164 | A1 | 3/2010 | Goudy, Jr. |
| 2010/0134947 | A1 | 6/2010 | Goudy, Jr. |

FOREIGN PATENT DOCUMENTS

| DE | 10 81 570 B | 5/1960 |
| GB | 626 544 A | 7/1949 |
| JP | 2003 340271 A | 12/2003 |
| JP | 2004 340049 A | 12/2004 |
| JP | 2006 002983 | 1/2006 |

(Continued)

OTHER PUBLICATIONS

Office Action mailed Oct. 28, 2011, corresponding to U.S. Appl. No. 12/524,419, filed Nov. 13, 2009.

(Continued)

*Primary Examiner* — Stephen W Jackson
(74) *Attorney, Agent, or Firm* — Renner, Otto, Boisselle & Sklar, LLP

(57) ABSTRACT

A method of using honeycomb material having opposite surfaces and flow channels between the surfaces, includes directing fluid flow through the channels while applying a voltage between the surfaces and across fluid flowing in the channels. A method of using honeycomb material that includes at least one electrode, the honeycomb material and electrode be useful in an electrical or electronic device, includes using the honeycomb material to support or to suspend the electrical or electronic device. An apparatus includes a honeycomb structure of dielectric material having a number of flow channels therethrough, an electrode at a surface of the dielectric material responsive to electrical input to apply an electrical response alone or with regard to another electrode, the honeycomb structure having cohesive strength and rigidity to support itself and the electrode from in suspended relation.

5 Claims, 16 Drawing Sheets

FOREIGN PATENT DOCUMENTS

| | | |
|---|---|---|
| JP | 2006 161595 A | 6/2006 |
| WO | WO 2005/083241 A | 9/2005 |
| WO | 2008092083 | 7/2008 |
| WO | WO 2008/092073 A2 | 7/2008 |
| WO | WO 2008/092083 A1 | 7/2008 |
| WO | WO 2008/092089 A1 | 7/2008 |

OTHER PUBLICATIONS

International Search Report for corresponding International Application No. PCT/US2008/052033, date of mailing Oct. 16, 2008, and Written Opinion.

International Search Report for corresponding International Application No. PCT/US2008/052057, date of mailing Aug. 28, 2008, and Written Opinion.

International Search Report for corresponding International Application No. PCT/US2008/052069, date of mailing May 28, 2008, and Written Opinion.

Office Action, dated Mar. 21, 2011, in U.S. Appl. No. 12/524,419, filed Nov. 13, 2009.

Office Action, dated Oct. 28, 2011, in U.S. Appl. No. 12/524,419, filed Nov. 13, 2009.

* cited by examiner

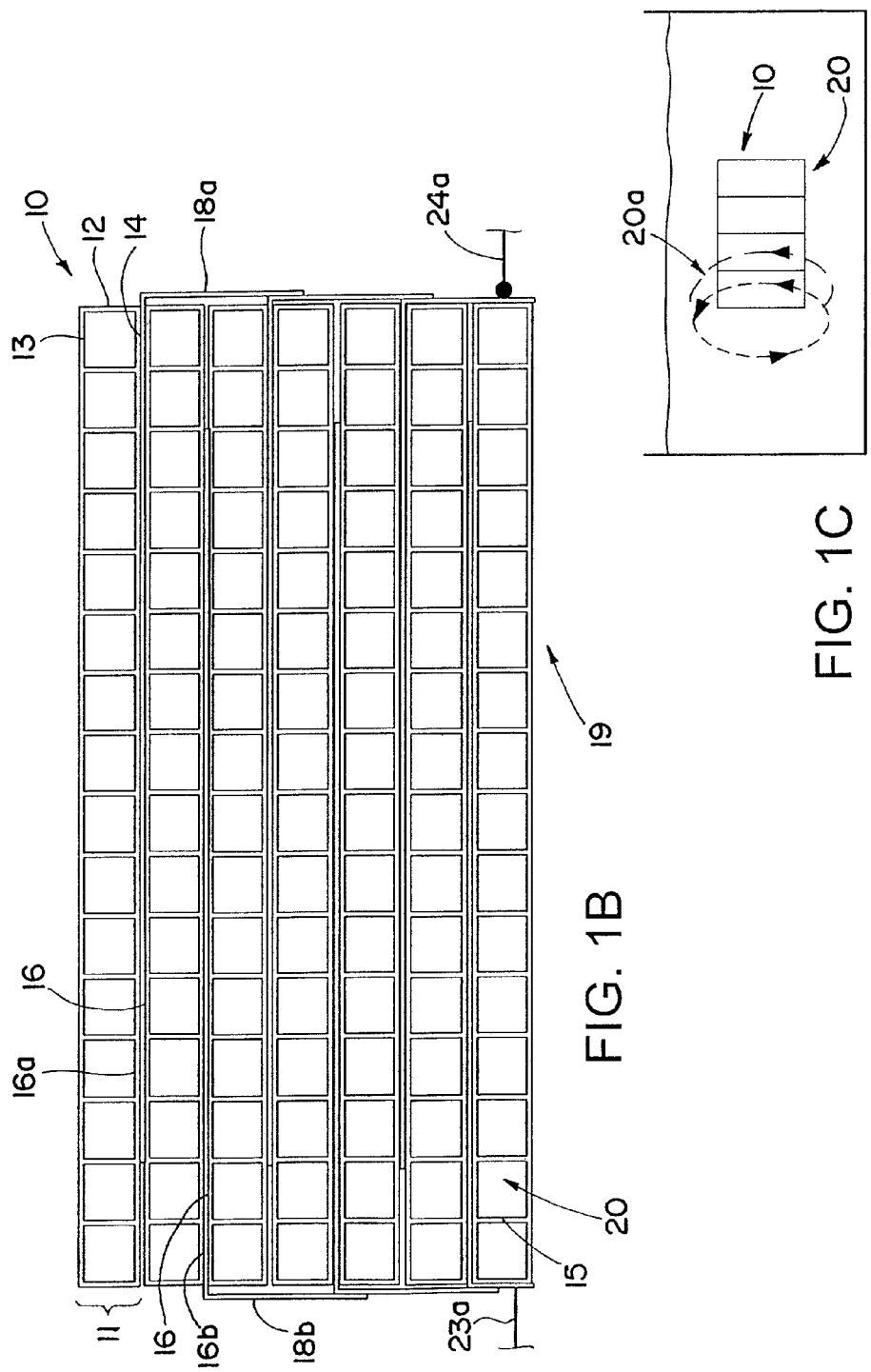

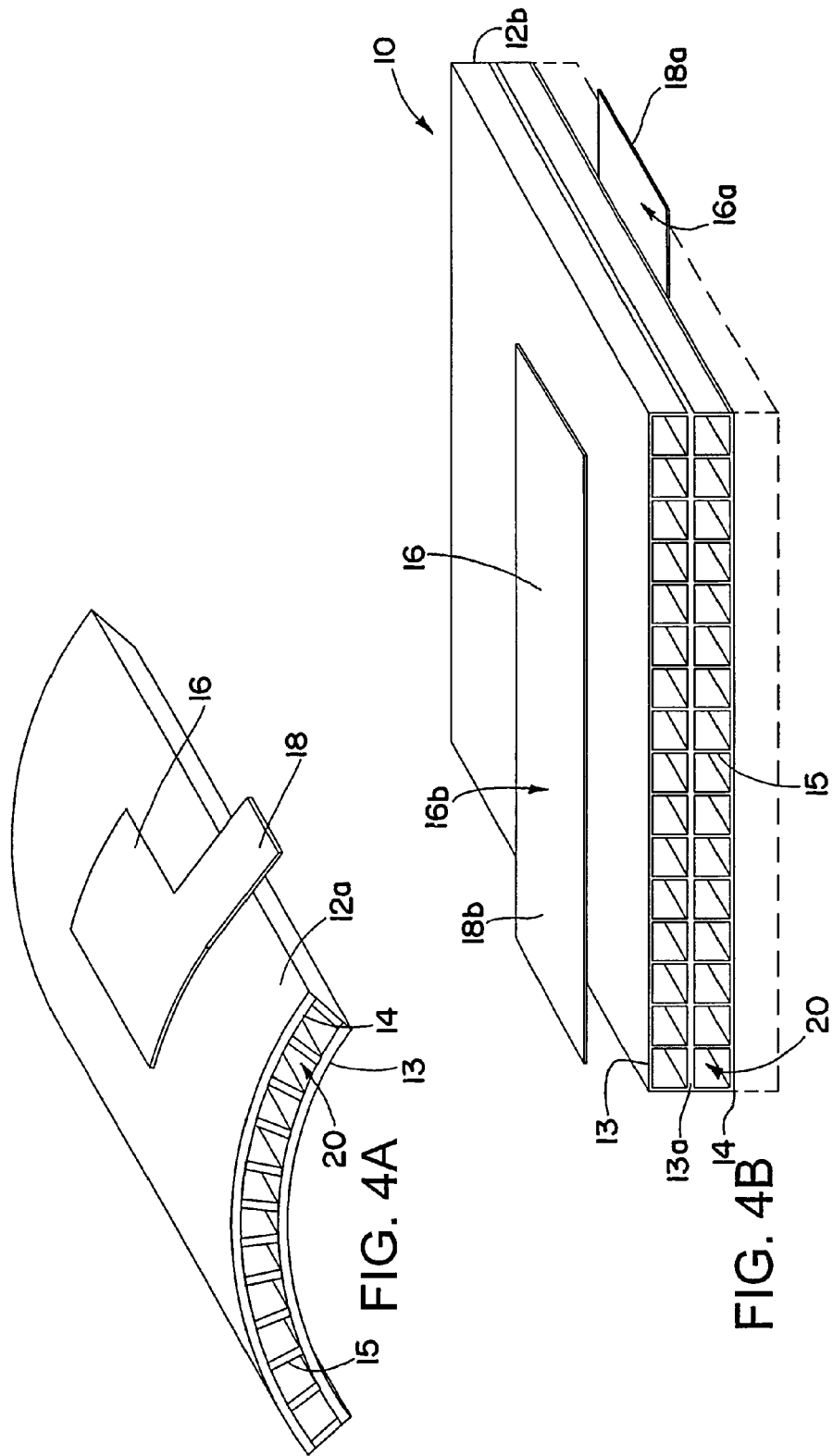

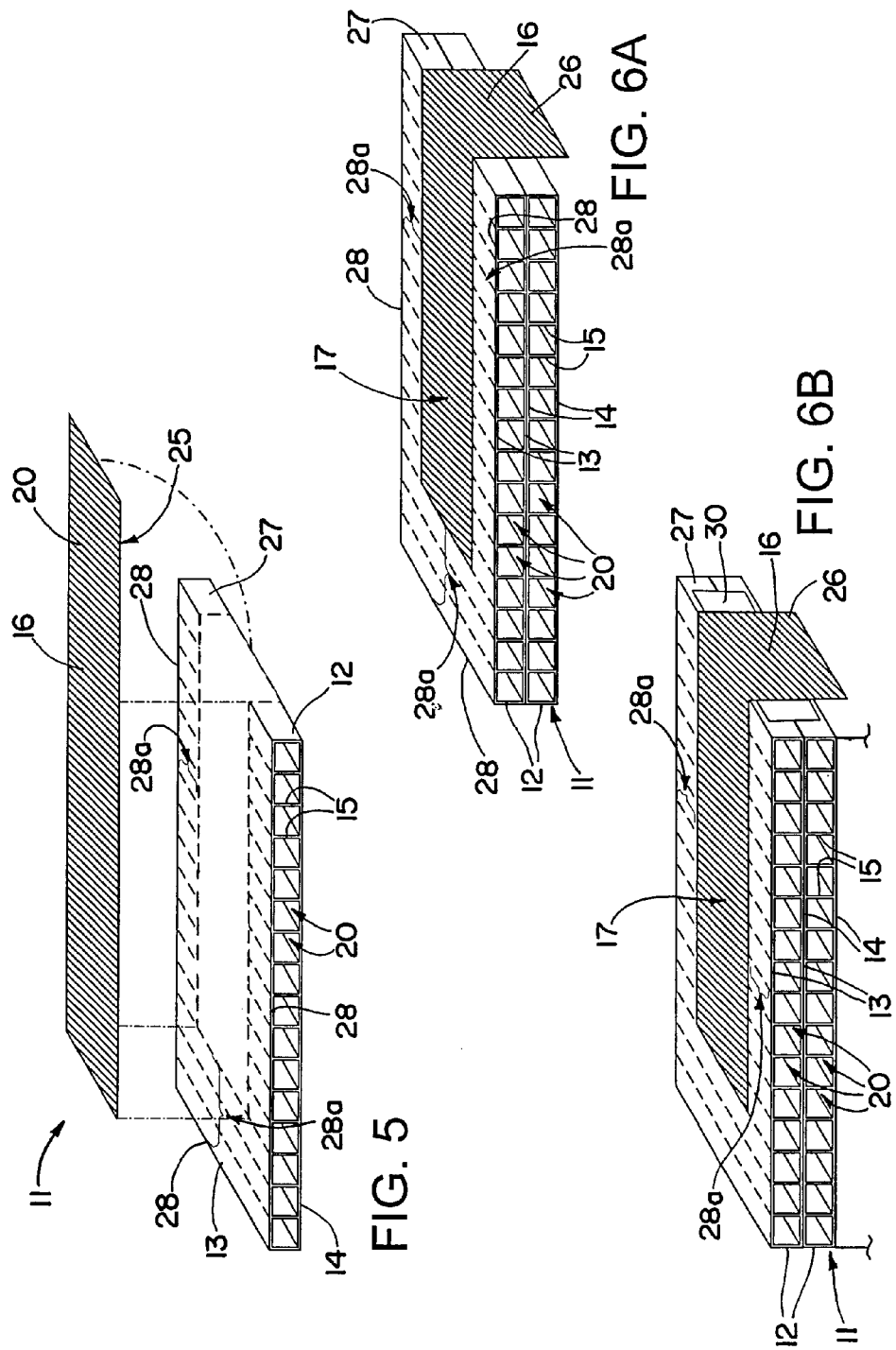

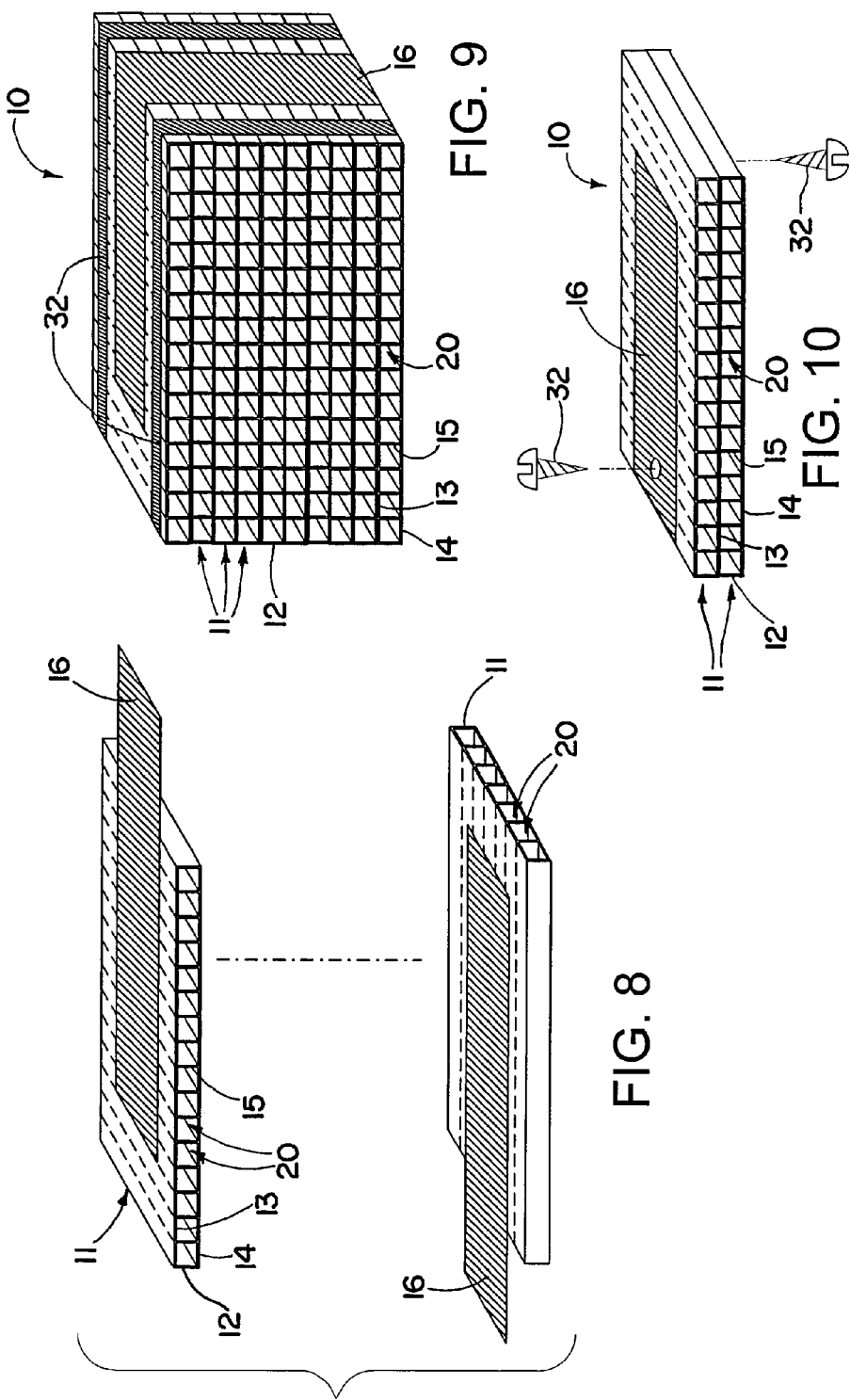

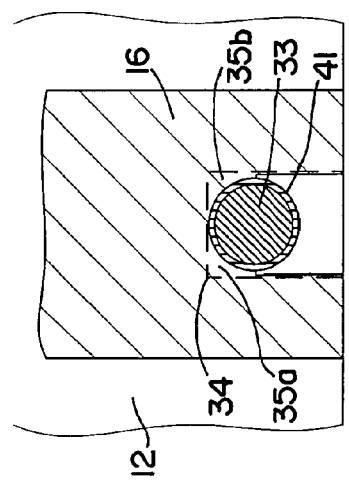
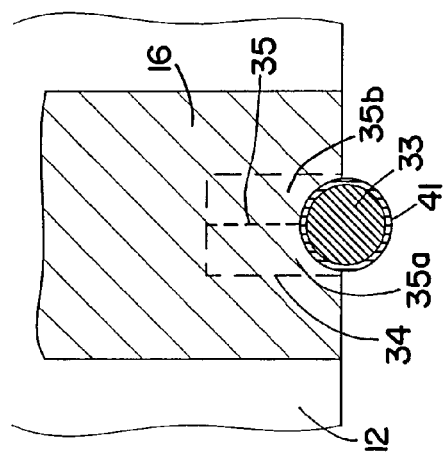
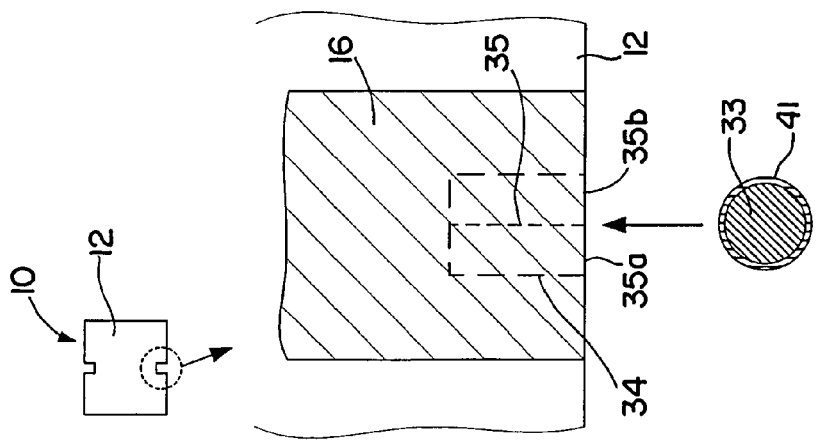

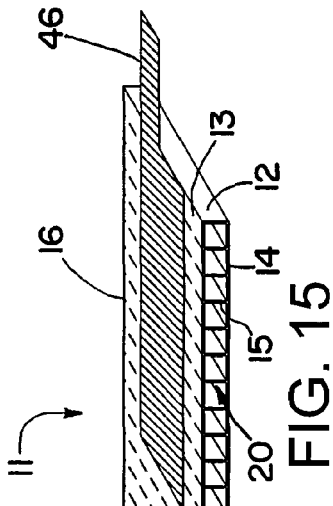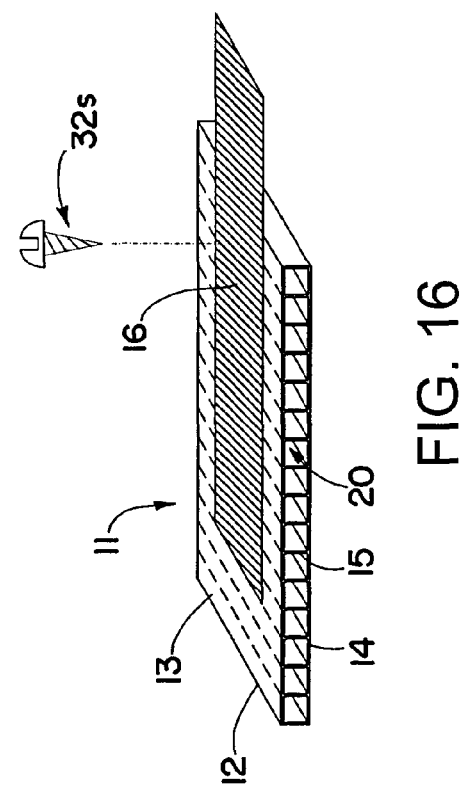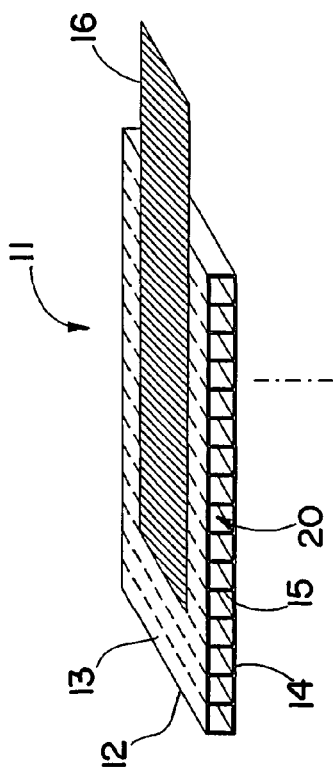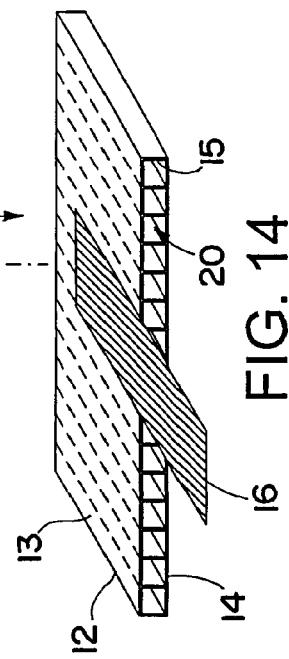
FIG. 14
FIG. 15
FIG. 16

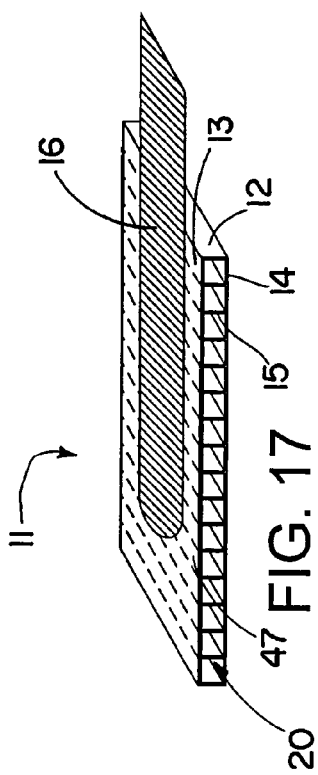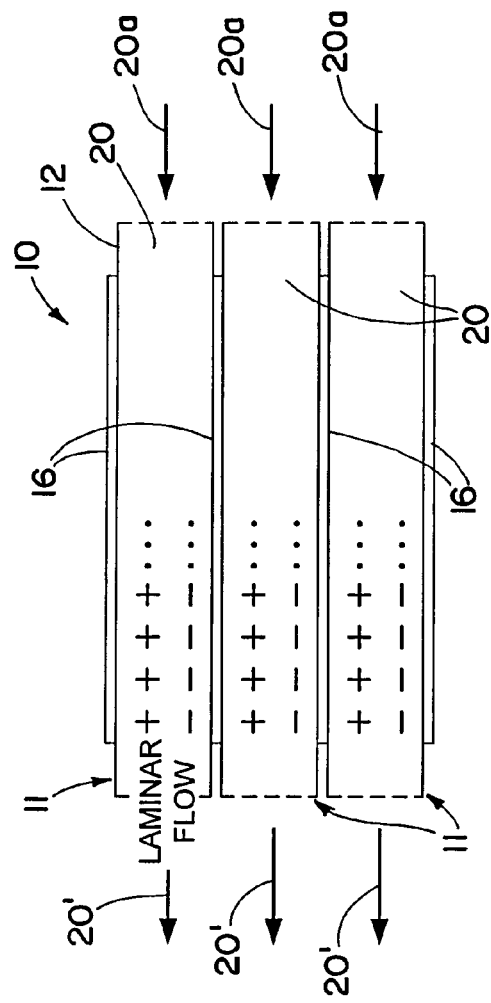

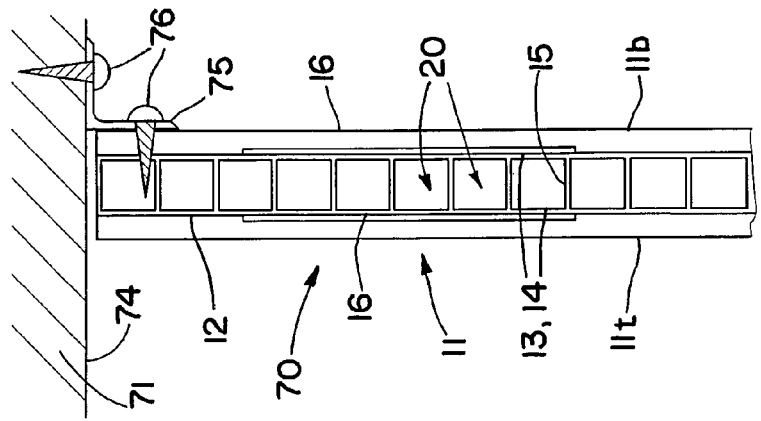
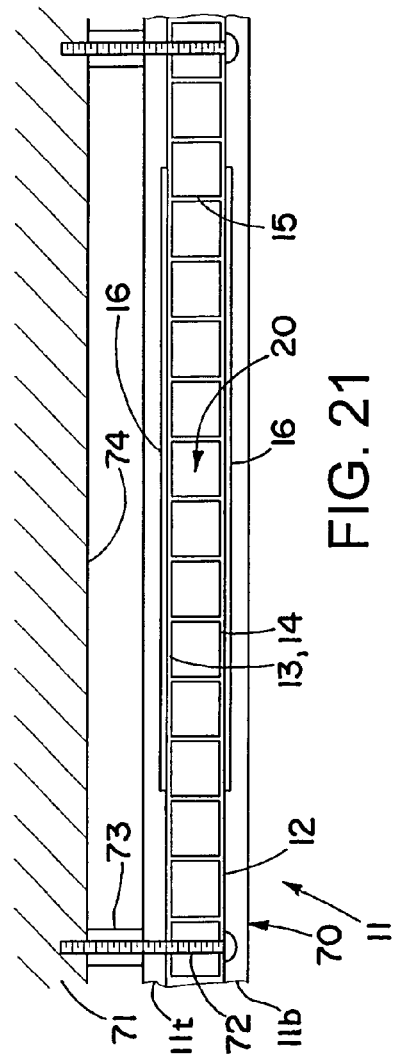
FIG. 22
FIG. 21

HONEYCOMB STRUCTURE AND METHOD OF USING THE STRUCTURE

CROSS-REFERENCE TO RELATED APPLICATION

This application claims the benefit of U.S. Provisional Patent Application Ser. No. 60/886,620, filed Jan. 25, 2007, the entire disclosure of which is hereby incorporated by reference.

TECHNICAL FIELD

The present invention relates generally to the field of honeycomb materials, and to methods of making and using honeycomb materials.

BACKGROUND

Ionizers are prevalent in a wide variety of industries and applications. Electrical capacitors also are well known. Examples of ionizers and capacitors are disclosed in copending, concurrently filed, commonly owned U.S. Provisional Patent Application Ser. No. 60/886,581 entitled FLUID COOLED ELECTRICAL CAPACITOR AND METHODS OF MAKING AND USING and Ser. No. 60/886,570 entitled ELECTRICAL IONIZER AND METHODS OF MAKING AND USING. The disclosures of such patent applications are incorporated in their entirety by this reference thereto.

SUMMARY OF THE INVENTION

An aspect of the invention relates to honeycomb material used in various devices.

An aspect of the invention relates to use of honeycomb material that is self supporting so that an electrical, electronic, etc. device that is made therefrom may be suspended, hung, supported, mounted, etc., by reliance directly on or from the honeycomb.

An aspect of the invention relates to use honeycomb material that does not support combustion.

An aspect of the invention relates to use of honeycomb material in subunits for capacitors, ionizers, and other electrical and electronic devices.

An aspect of the invention relates to use of honeycomb material in combination with an electrode.

An aspect of the invention relates to honeycomb material to provide flow channels for cooling a capacitor or for conducting a fluid intended to be ionized.

An aspect of the invention relates to a method of using honeycomb material having opposite surfaces and flow channels between the surfaces, including directing fluid flow through the channels while applying a voltage between the surfaces and across fluid flowing in the channels.

An aspect of the invention relates to a method of using honeycomb material having opposite surfaces and fluid channels between the surfaces and having a fluid therein, including directing an alternating current (AC) voltage across fluid in a number of the channels to create electric arc or corona discharge in the fluid over a number of cycles of the AC voltage, whereby the AC voltage increases energy level of the fluid for a portion of a half cycle of the AC voltage and tends to move fluid particles in one direction, and the subsequent half cycle of the AC voltage tends to move fluid particles in the opposite direction, and whereby the change in direction of particles is an acceleration causing emission of photons.

An aspect of the invention relates to the combination of a honeycomb structure and an electrode on a surface thereof, the honeycomb having a flow through channel therein and the electrode being fluidically isolated from contacting fluid in the channels.

An aspect of the invention relates to an apparatus including a honeycomb structure of dielectric material having a number of flow channels therethrough, an electrode at a surface of the dielectric material responsive to electrical input to apply an electrical response alone or with regard to another electrode, the honeycomb structure having cohesive strength and rigidity to support itself and the electrode from in suspended relation.

An aspect of the invention relates to an apparatus including a honeycomb structure of dielectric material having a number of flow channels therethrough, an electrode at a surface of the dielectric material responsive to electrical input to apply an electrical response alone or with regard to another electrode, the honeycomb structure having cohesive strength and rigidity to support itself and the electrode from in suspended relation.

Another aspect relates to an ionizer formed of dielectric honeycomb material and a pair of electrodes.

Another aspect relates to use of the combination of honeycomb material and a fluid in the honeycomb material as a dielectric in an ionizer.

Another aspect relates to an ionizer subunit including a dielectric honeycomb; and an electrical conductor on at least one dielectric sheet of the dielectric honeycomb.

Another aspect relates to an ionizer assembly including a stack of a plurality of ionizer subunits wherein an electrical conductor of at least one ionizer subunit is cooperative with an electrical conductor of another ionizer subunit to function as an ionizer.

Another aspect relates to a method of making an ionizer subunit including disposing a conductive material on at least one dielectric sheet of a dielectric honeycomb.

An aspect of the invention relates to an assembly including at least two dielectric sheets, at least one flow through channel between the sheets, and an electrical conductor associated with one of the sheets and separated from the channel by that sheet and adapted to cooperate with another electrode to apply voltages to a fluid in the channel to cause ionization of the fluid.

Another aspect relates to an ionizer including a pair of dielectric sheets, one or more fluid channels between the sheets, electrodes respectively at each sheet separated from the channels as not to contact fluid therein and adapted to receive electric voltage to ionize fluid in the channels, and wherein the sheets and fluid in the channels are a dielectric between the electrodes of the ionizer.

Another aspect relates to an ionizer subunit including a dielectric honeycomb; and an electrical conductor at at least one dielectric sheet of the dielectric honeycomb.

Another aspect relates to an ionizer including a dielectric honeycomb material having a plurality of fluid flow channels therein and an electrode at each surface of the honeycomb material, wherein the channels are of a configuration to promote laminar flow in the channels.

Another aspect relates to an electric ionizer, including a honeycomb dielectric having respective opposite generally parallel support surfaces, and a number of fluid passages in the honeycomb dielectric between said support surfaces, and an electrical conductor at each of said support surfaces, and said electrical conductors having respective portions that are in generally parallel, confronting relation separated by the honeycomb dielectric to provide electrical ionization potential to fluid in the passages.

Another aspect relates to an ionizer including a non-uniform density dielectric support having respective parallel surfaces, a pair of electrical conductors, one at one of the parallel surfaces and one at the other of the parallel surfaces and relatively positioned to provide electrical capacitance, and cooling means in the non-uniform density dielectric support.

Another aspect relates to an ionizer including electrodes, and a dielectric support for the electrodes adapted to conduct ionizable gas between the electrodes without the gas contacting the electrodes.

Another aspect relates to a method of cooling an ionizer that includes electrodes, including thermally coupling cooling fluid with the electrodes for substantially uniform cooling thereof without contact of the cooling fluid with the electrodes.

Another aspect relates to a method of making an ionizer subunit including disposing a conductive material at at least one dielectric sheet of a dielectric honeycomb.

Another aspect relates to a method of operating an ionizer having a number of electrodes separated by dielectric sheets that are spaced apart by ribs providing fluid flow passages between the dielectric sheets, wherein alternating current voltage is applied to the ionizer, including directing a cooling fluid flow through the fluid flow passages.

Another aspect relates to a method of cooling an ionizer formed of a honeycomb material having respective sheet-like surfaces and a number of fluid flow channels through the honeycomb material between the surfaces, and an electrode at each surface of the honeycomb material, including directing a flow of fluid through a number of the fluid flow channels.

Another aspect relates to a method of supplying a fluid to an ionizer that includes electrodes, whereby the fluid does not contact the electrodes.

These and further features of the present invention will be apparent with reference to the following description and attached drawings. In the description and drawings, several exemplary embodiments of the invention have been disclosed in detail as being indicative of some of the ways in which the principles of the invention may be employed, but it is understood that the invention is not limited to those. Rather, the scope of the invention is determined by the claims and all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

These and further features of the present invention will be apparent with reference to the following description and drawings, wherein:

FIG. 1B is a schematic elevation view of the ionizer assembly of FIG. 1A showing exemplary electrical connections of respective electrodes;

FIG. 1C is a schematic illustration of an ionizer assembly suspended in a fluid and undergoing convection cooling;

FIG. 4A is a schematic isometric view of a non-planar ionizer subunit;

FIG. 4B is a fragmentary isometric view of an ionizer assembly using tri-wall honeycomb structure;

FIG. 5 is an exploded isometric view of an ionizer subunit;

FIG. 6A is an isometric view of two ionizer subunits of FIG. 5 assembled;

FIG. 6B is an isometric view of the two ionizer subunits of FIG. 5 with an insulator installed on the edges between two honeycomb dielectric sheets;

FIG. 8 is a schematic illustration of a number of ionizer subunits to depict an alternative method of assembling ionizer subunits to make an ionizer assembly;

FIGS. 9 and 10 are isometric views illustrating respective ionizer assemblies assembled using different respective fastening mechanisms;

FIGS. 13A-13E are schematic illustrations of a connection mechanism of an ionizer assembly depicting an alternative method of assembling a number of ionizer subunits;

FIG. 14 is an exploded schematic isometric view of two ionizer subunits depicting an alternative method of assembling a number of ionizer subunits to make an ionizer assembly;

FIG. 15 is an isometric view of an ionizer subunit having a shaped conductive tab electrode;

FIG. 16 is an isometric view of an ionizer subunit having a conductive paint electrode;

FIG. 17 is an isometric view of an ionizer subunit having a shaped conductive electrode;

FIG. 18 is a fragmentary schematic illustration of fluid flow through an ionizer of the invention with representations of ions in the flow channels and a laminar flow ionized output;

FIGS. 21 and 22 are schematic illustrations of an ionizer assembly using the honeycomb structure thereof as structural support as lateral and vertical supports, respectively, to support the ionizer assembly from another supporting device, such as a wall, ceiling, etc.

DESCRIPTION

Figure 1A:
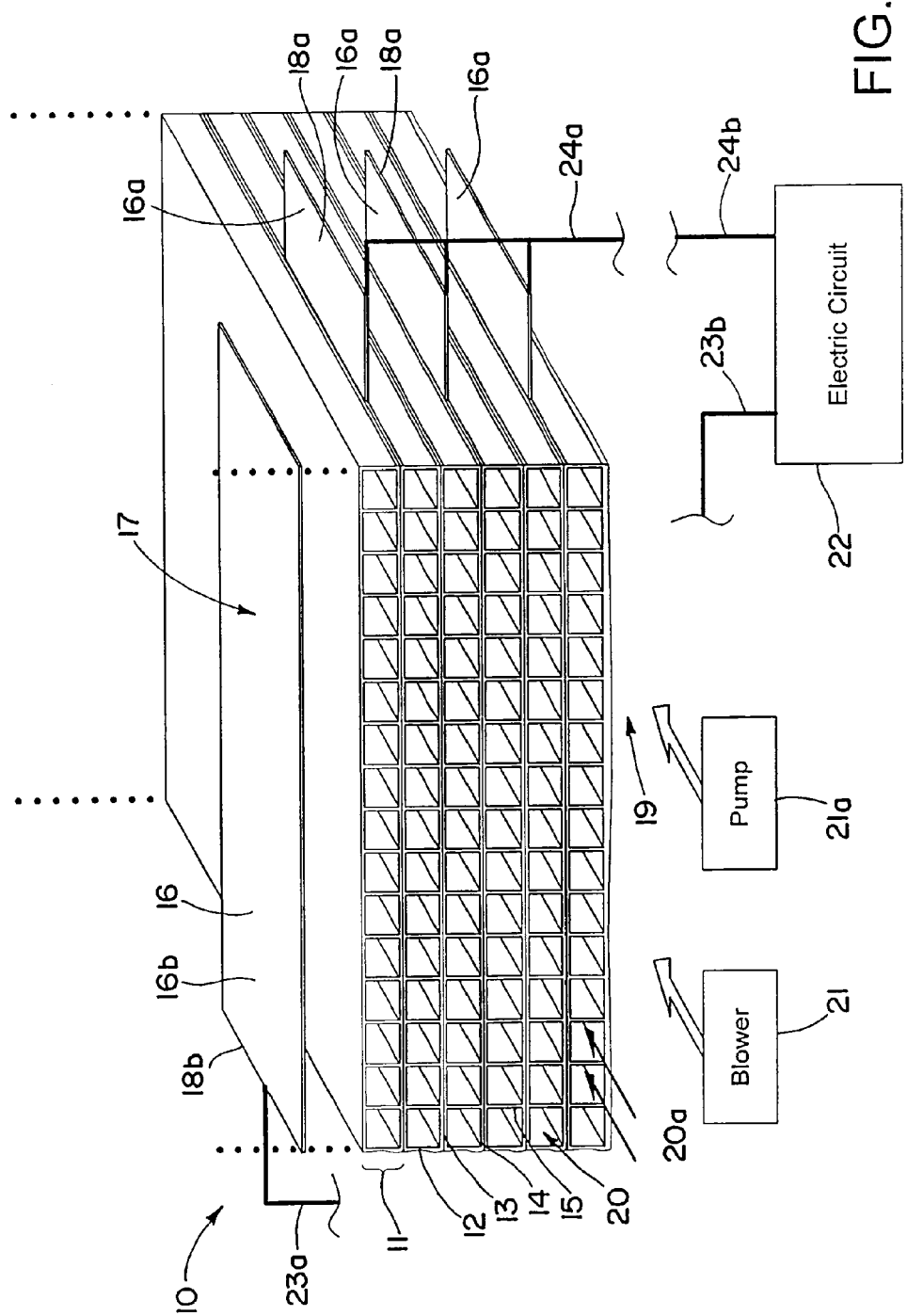
FIG. 1A is an isometric view of an ionizer assembly in an overall system according to an embodiment of the present invention.

The present invention will now be described with reference to the drawings, wherein like reference numerals are used to refer to like elements throughout. Primed reference numerals may be used to designate parts similar to those designated by the same unprimed reference numeral. It will be understood that the figures are not necessarily to scale and that directions may be mentioned for convenience of the description, but are not necessarily limiting or required.

Referring initially to FIGS. 1A and 1B (collectively referred to as FIG. 1), an ionizer assembly 10 according to an embodiment of the present invention is illustrated. As is described more fully below, a single ionizer includes a pair of dielectric sheets, one or more fluid channels between the sheets, and electrodes respectively at the dielectric sheets, e.g., attached thereto or spaced apart therefrom but in relatively close proximity thereto. The electrodes generally are separated from the channels so as not to contact the fluid therein. The sheets and fluid are a dielectric between the electrodes. The ionizer assembly may include a plurality of such ionizers, for example, arranged in stacked relation, and electrodes may be shared by two ionizers, as is described in greater detail below.

The ionizer assembly 10 includes a number of ionizer subunits 11, which are assembled in a stacked relation. The ionizer subunits 11 are formed of a honeycomb structure 12 (sometimes referred to as honeycomb) that has a pair of generally planar dielectric sheets 13, 14 separated by dielectric separators 15, which may be referred to below as "ribs" or as "supports." The honeycomb structure 12 is electrically non-conductive, e.g., made of dielectric material. An electrode 16 is between respective relatively adjacent honeycomb structures 12. In addition to a honeycomb structure 12, an ionizer subunit 11 also includes one of the electrodes. Respective pairs (or more) of electrodes 16 spaced apart by honeycomb structures 12, may be referred to as an ionizer 17. Accordingly, in assembled relation of ionizer subunits 11 to form the ionizer assembly 10, respective pairs of electrodes 16, which are separated by a honeycomb structure 12, function as ionizers 17. The ionizers 17 may be combined to provide increased production of the ionizer assembly 10, e.g., as a stack of ionizers. The honeycomb structure may provide for controlled and relatively accurate spacing of the electrodes, which are at each surface of a respective honeycomb, to provide for relatively accurate control of the voltage gradient of the ionizer assembly 10.

Dotted lines at the top of FIG. 1A indicate that top and base pieces (described below) or more ionizer subunits may be included in the ionizer assembly 10. In FIG. 1B the top-most honeycomb structure 12 does not have an upper electrode and may serve as the top of the ionizer assembly 10; the bottom of the ionizer assembly may be similar to the top in that sense.

As is seen in FIG. 1, several of the electrodes 16 may be electrically connected to each other. For example, with several ionizer subunits 11 in the ionizer assembly 10, the electrodes 16a may be electrically connected together and the electrodes 16b (only one of which is seen in FIG. 1) may be electrically connected together. In operation of the ionizer assembly 10 to produce a corona, the electrodes 16a are at the opposite polarity from the electrodes 16b. In the illustration of FIG. 1, tab portions 18a of electrodes 16a extend beyond an edge of honeycomb structures 12. As shown in FIG. 1B, the tab portions 18a, 18b are folded or bent into engagement to make the electrical connection thereof with other respective tab portions 18a, 18b. These electrical connections also are shown in FIG. 7. The ionizer assembly 10 may be part of an electrical circuit 19.

As is seen in FIG. 1, a number of ionizer subunits 11 may be stacked together and an electrode of one subunit may be shared in respective relatively adjacent ionizers 17. The electrodes 16 of each ionizer 17 are relatively uniformly separated by a respective honeycomb structure; and fluid 20a in respective flow channels 20 does not come into engagement (does not contact) the electrodes.

A number of flow through channels 20 (sometimes referred to as passages, paths, pathways, flow channels, channels or the like) are in respective honeycomb structures 12 of the ionizer subunits 11. The flow through channels provide the fluid (gas) source for ion production, for cooling or other purpose, as is described below. There may be only one channel 20 or, as is illustrated in a number of the exemplary embodiments, there may be a plurality of channels 20 in an ionizer subunit 11. The channels 20 of an ionizer subunit 11 may be the space between the sheets 13, 14 and the ribs 15 of the honeycomb structure 12 of the ionizer subunits. The ribs 15 separate the dielectric sheets 13, 14 from each other and divide the space between the dielectric sheets 13, 14 into respective flow channels. The ribs 15 and dielectric sheets may be, for example, integrally formed as a single structural unit or several parts thereof may be separately formed and assembled to make the honeycomb structure 12.

A respective channel 20 may be fluidically isolated from some or all of the other channels 20, or it may be connected to one or more other channel(s), e.g., by an opening in a rib 15 between adjacent channels. A fluid may be disposed in or passed through one or more of the channels 20, for example, to effect fluid supply to the ionizer subunit to affect ion production of the ionizer subunit. In FIG. 1, as an example, a fan 21 blows fluid, for example, air or other gas, toward the ionizer assembly 10, through the channels 20 of respective ionizer subunits 11, and out of the ionizer assembly 10. If desired, fluid through the channels 20 may be provided by convection; as an example, with channels 20 in vertical orientation a chimney effect may occur whereby warmer fluid rises and flows through the channels, e.g., as is illustrated in FIG. 1C.

The ionizer assembly 10 may be used as a capacitor, which is referred to just below as a capacitor assembly 10.

As an example of operation of a capacitor assembly 10 of FIG. 1, the electrodes 16a, 16b may be connected to an electric circuit or component, e.g., as is shown at 22, of the electrical circuit 19. Terminals, wire connections, etc. 23a, 24a electrically couple the capacitor assembly 10 to the electric circuit 22 via respective terminals, wire connections, etc. 23b, 24b, to function as a capacitor in the electrical circuit 19. The capacitance of the capacitor assembly 10 may depend on, for example, the number of capacitor subunits 11, the size and shape of the capacitor subunits 11 and parts thereof, the size, shape and relative location of respective electrodes 16, the material used to form the electrodes 16, spacing of the electrodes as provided by the thickness of the dielectric honeycomb structure 12, electrical or dielectric characteristics of the honeycomb structures 12 and the fluid(s) in channels 20, the electrical connections 23a, 24a of electrodes 16, to respective terminals or the like 23b, 24b of the electric circuit 22, the voltage applied to or by the electric circuit, environmental conditions, or other variables. During operation of the capacitor assembly 10, the fluid 20a in the channels 20 may affect capacitance.

In an example of operating capacitor assembly 10, an electrical voltage is applied across the electrodes 16a, 16b. The honeycomb structure supports the electrodes in parallel, spaced apart, and at least partially overlapping relation. The capacitor assembly 10 may operate as a standard electrical capacitor operates. During normal operation, if desired, the capacitor assembly 10 may be cooled by fluid 20a that may be blown or pumped through the channels 20. The fluid 20a cools the capacitor assembly and respective parts thereof. The honeycomb structure 12 and the fluid 20a provide a dielectric for the ionizers 17 of the ionizer assembly 10. The honeycomb structure maintains separation of the fluid 20a from the electrodes 16 so that the fluid does not contact the electrodes while permitting thermal transfer from the electrodes via the honeycomb structure to the fluid. Thus, the fluid and the electrodes are thermally coupled. The fluid 20a may be freshly supplied to the capacitor assembly 10 from a separate source, e.g., ambient air, oil storage supply, etc., and/or the fluid may be recirculated or recycled, possibly after first undergoing treatment, for example, to cool it, to ground it to remove any excess charge, and/or to dry it.

As is described in greater detail below, if a circumstance were to occur that the capacitor assembly 10 becomes hotter than desired for desired operation, for example, due to the input electrical voltage thereto having at least a portion that exceeds the break down voltage of dielectric of the capacitor assembly or due to a high frequency input electrical voltage, the fluid may be used not only to cool the capacitor assembly but also to tend to blow out from a channel a corona discharge or the electron leakage at the start of a corona discharge buildup thereby to avoid break down of the dielectric. Such capabilities of the capacitor assembly 10 lead to a robust apparatus. Also, as will be appreciated, a number of capacitor assemblies 10 may be used together to increase the capacitance characteristics thereof and of the electrical circuit in which used. The capacitor assembly 10 is modular in that several may be used together; also the capacitor subunits 11 are modular in that more or fewer may be used in a capacitor assembly.

The ionizer assembly 10 may be used as an ionizer for fluid passing through the channels.

As an example of operation of an ionizer assembly 10 of FIG. 1, the electrodes 16a, 16b may be connected to an electric circuit 22. Terminals, wire connections, etc. 23a, 24a electrically couple the ionizer assembly 10 to the electric circuit 22 via respective terminals, wire connections, etc. 23b, 24b, to function as an ionizer in the electrical circuit 19. The electric circuit 22 may include a voltage source for the ionizer assembly 10 to operate the ionizer to cause ionization of fluid 20a in the channels 20. The electric circuit 22 may include controls, e.g., controls 62 described further below, to control operation of the ionizer assembly 10. The voltage applied to the ionizer assembly 10 may be an alternating current (AC) voltage or may be a direct current (DC) voltage. The magnitude of the input voltage, either as absolute magnitude, rms value, peak to peak magnitude, etc., that is provided to the ionizer assembly, e.g., across or between respective pairs of electrodes 16, may be adequate to cause ionization of at least some of the fluid 20a in the channels 20.

The ion production of the ionizer assembly 10 may depend on, for example, the number of ionizer subunits 11, the size and shape of the ionizer subunits 11 and parts thereof, the size, shape and relative location of respective electrodes 16, the material used to form the electrodes 16, spacing of the electrodes as provided by the thickness of the dielectric honeycomb structure 12, electrical or dielectric characteristics of the honeycomb structures 12 and the fluids in channels 20, the electrical connections 23a, 24a of electrodes 16, to respective terminals or the like 23b, 24b of the electric circuit 22, the voltage applied to or by the electric circuit, environmental conditions, or other variables. During operation of the ionizer assembly 10, a fluid may be passed through or may be disposed in the channels 20 and may affect corona generation and thus ion production. The ions produced by the ionizer are in a sense drawn from or derived from such fluid in the channels. In operation of an embodiment at least part of the fluid becomes ionized.

In an example of operating ionizer assembly 10, an electrical voltage is applied across the electrodes 16a, 16b. The honeycomb structure supports the electrodes in parallel, spaced apart, in at least partially overlapping relation. Fluid 20a is blown or pumped through the channels 20. The fluid 20a cools the ionizer assembly and respective parts thereof. The honeycomb structure 12 and the fluid 20a provide a dielectric for the ionizers 17 of the ionizer assembly 10. The honeycomb structure maintains separation of the fluid 20a from the electrodes 16 so that the fluid does not contact the electrodes or otherwise come into direct contact with the electrodes, while permitting thermal transfer from the electrodes via the honeycomb structure to the fluid. Thus, the fluid and the electrodes are thermally coupled. The fluid 20a may be freshly supplied to the ionizer assembly 10 from a separate source, e.g., ambient air; and/or the fluid may be supplied, possibly after first undergoing treatment to cool it, to ground it to remove any excess charge, and/or to dry it.

The invention now will be described in detail with reference to use as an ionizer. It will be appreciated that features of the invention may be used in other environs, e.g., as a capacitor or as another device.

As is illustrated and described further below, the electrodes of an ionizer are not in contact with the fluid that is being ionized, and a voltage applied to electrodes ionizes fluid in flow channels that are separated from and not in direct contact with the electrodes. In an embodiment the electrodes are spaced apart by a honeycomb that has flow channels for the fluid that is being ionized. In operation ionization occurs in the fluid; as there is no direct external source of electrons provided the fluid, it appears that electrons are drawn from molecules or atoms in the fluid to cause ionization of fluid. It also appears that as AC voltage is applied to the electrodes which in turn apply an electric field across the fluid, when the AC voltage and, thus, the electric field reverses, there is relatively less tendency for reversion when the fluid flows through the channels at an adequately fast speed as is described further below.

Ion reversion is the grounding of an ion after it has been generated. This can occur through contact with an ion of opposite and at least equal charge, contact with an electron donor, such as an exposed electrode that supplies electrons directly to the ion, contact with air and contact with free electrons, which may be available in the course of the ionization process. However, if the gas moves rapidly, electrons liberated in the process collect on the positive electrode side and, thus, may in view of that collecting effectively be at least somewhat removed from the ion stream and tend not to be available to effect reversion.

The flow channels in the ionizer promote laminar flow of the fluid that is directed through the ionizer. The flow rate may be controlled such that the residence time of fluid in the flow channels is at or slightly greater than one half the duty cycle of each half cycle of the applied AC voltage to the electrodes; duty cycle is referred to here as the duration that a half cycle of the applied voltage equals or exceeds the break down voltage of the fluid that would tend to cause ionization of the fluid. Such laminar flow and flow rate tend to prevent mixing of ions in the ionizer before discharge as the ionized fluid, and ozone formation within the ionizer itself is non-existent or is relatively small compared to the relatively larger amount of ozone that is generated in conventional ionizers. The laminar flow and flow rate and the non-mixing of the ions in the ionizer also are carried forward to the fluid output of the ionizer such that the ionized fluid continues to have properties of being ionized at relatively far distances from the outlet of the ionizer, e.g., in some instances has been found that this is the case at distances on the order of from about 20 feet to about 30 feet from the outlet of the ionizer.

Since the electrodes (conductors) 16 of the ionizers 17 of the ionizer assembly 10 are not in direct contact with the fluid 20 being ionized, there is no addition of metal from the electrodes to the ion stream, and there is no corrosion of the electrodes due to such a contacting of the ion stream with the electrodes. Thus, the ionized stream output is in a sense cleaner than the ionized stream output from prior ionizers, and the electrodes tend to have greater longevity.

Also, by in a sense covering the electrodes 16 to keep them from contacting the fluid 20a in the channels 20, e.g., by the separation provided by the honeycomb structure 12, the electrodes are not ion donors. Therefore, there tends to not be ion breakdown, reversion or self-grounding of the ions. As the electrodes do not contact the fluid, especially ionized fluid, the electrodes do not contribute electrons to the ions that would bring the ions back to a ground state.

From the foregoing, it will be appreciated that volumetric efficiency of the ionizer in terms of ions produced is rather substantial compared to prior ionizers.

Ionized output of the ionizer tends to be relatively efficient, and, in a sense tends to be maximized in its utility, by minimizing ion mixing due to the above-mentioned laminar fluid flow and flow rate as well as the post formation (production of the ions in the ionizer) grounding by contact with other ions, electrons and non-ionized fluid, e.g., air, outside of the ionizer, as laminar flow tends to be maintained for a substantial distance beyond the outlet of the ionizer.

As is described in greater detail below, if a circumstance were to occur that the ionizer assembly 10 becomes hotter than desired for desired operation, for example, due to the input electrical voltage being greater than usual, e.g., due to a power surge, due to operating at relatively high voltage and/or frequency, etc., so as to cause hot spots, excessive corona, or possibly electrical arc in the fluid channels, the fluid 20a may be used not only to cool the capacitor assembly but also to tend to blow out from a channel a hot spot, an excessive corona discharge or the electron leakage at the start of a corona discharge buildup, etc. thereby to avoid break down of the dielectric, e.g., the fluid and/or the honeycomb structure. Such capabilities of the ionizer assembly 10 lead to a robust apparatus. Also, as will be appreciated, a number of ionizer assemblies 10 may be used together to increase the output of ions therefrom. The ionizer assembly 10 may be modular in that a number of them may be used together. Similarly, the ionizer subunits 11 are modular and more or fewer of them may be used in the ionizer assembly 10. The ions/ionized fluid may be used for a number of purposes such as, for example, deodorizing, such as deodorizing a room, furniture that was smoke damaged, etc. Also, the ions/ionized fluid may be used to kill undesirable matter, such as mold, etc.

One or more of the following advantages may be obtained in an ionizer according to the invention:

No metal surface is in contact with the ionized fluid, and this avoids metal in the ionizer output and avoids degrading of the electrodes. Also, ion reversion is avoided, e.g., recombining of ions or ions with electrons to return an atom or molecule to its ground state. The honeycomb structure maintains relatively accurate spacing of the electrodes without the need for careful machining to make the honeycomb, and the honeycomb structure provides relatively large fluid flow channels that do not present such high fluid back pressure that would require a relatively high powered centrifugal blower to blow fluid through the channels, and, therefore, a relatively less expensive blower may be used. The honeycomb structure may be made of a polymer, e.g., polycarbonate, which advantageously does not promote combustion, or of other suitable material that in most instances would be less fragile/more durable than the glass tube electrodes used in one of the above-mentioned prior ionizers. The ionizer provides a relatively robust ionized output or output of ions or ionized fluid in that the ions tend not immediately to combine and revert to a nonionized state within or outside the ionizer (post ionizer); and due to the relatively unimpeded laminar flow in the channels and the robust ionized output, the output from the ionizer may be a relatively highly directed stream of ions that projects from the exit of the ionizer a substantial distance, e.g., on the order of twenty feet or more from the exit, without diffusing or mixing internally.

Figure 3:
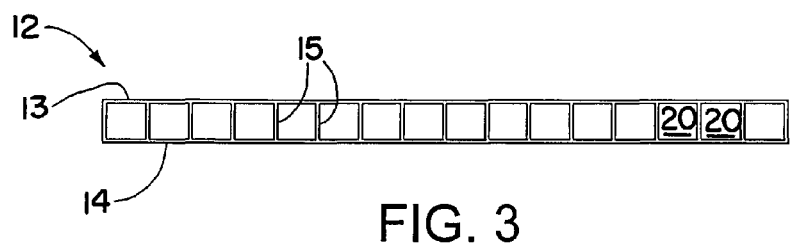
FIG. 3 is an exemplary front elevation view of the honeycomb material of FIG. 2 (the rear elevation view may be the same)
Figure 2:
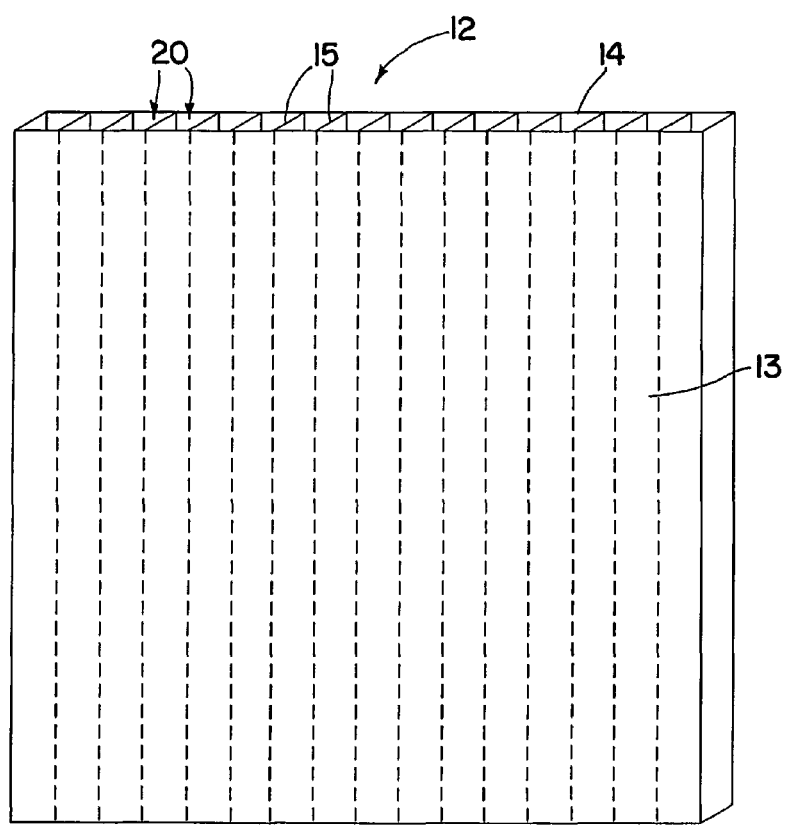
FIG. 2 is an isometric view of honeycomb material used in the ionizer assembly of FIG. 1.

Referring now to FIGS. 1-3, an example of honeycomb structure 12 used in the ionizer assembly 10 of FIG. 1 is shown. The honeycomb structure 12 includes at least two substantially parallel and at least partially overlapping dielectric sheets 13, 14 that are separated by at least two dielectric ribs 15. One or more flow through channels 20 are in the honeycomb structure 12. For example, the sheets 13, 14 and a pair of the ribs 15 may define at least one flow through channel 20; and with more than two ribs 15, there may be more than one flow channel 20 as illustrated.

In an embodiment of the invention there are a number of channels 20 and they are relatively deep, e.g., much longer than the smaller of the respective cross sectional dimensions thereof, which straightens fluid flow and thus promotes laminar flow through the channels. In the illustrated embodiment of FIG. 1, for example, the length of the channels 20 is much longer than both cross sectional dimensions of the channels. As a non-limiting example, the length of a channel may be greater than four times the smaller cross sectional dimension of the channel. Also, in an embodiment the cross sectional shape and dimensions of each of the channels in the honeycomb are at least substantially the same, which promotes uniform distribution of fluid to and through the channels. Laminar flow promotes even (e.g., substantially uniform) removal of ions and avoids the occurrence of or eliminates hot spots along the channels that can occur when hot ions are not removed; and the substantially uniform or even fluid distribution helps to maintain substantially uniform temperature of the ionizer assembly.

In the illustrated ionizer assembly 10 the flow channels 20 are of substantially the same cross sectional size and shape and substantially the same length. This shape, size and arrangement helps to assure substantially equal flow of fluid through the flow channels or containment of fluid therein for substantially uniform corona generation, cooling, and substantially uniform electrical characteristics, etc. over the area of each respective ionizer 17, ionizer subunits 11 and the ionizer assembly 10, as may be desired.

The honeycomb structure 12 may be made from electrically non-conductive material, e.g., glass, ceramic, clay, plastic, thermoplastic, acrylic, polycarbonate, polypropylene, polyethylene, phenolic, etc. or the like. The honeycomb structure 12 may be made by any suitable method (e.g., extrusion, molding, machining, etc.). A suitable commercial example of honeycomb structure 12 is manufactured by GALLINA USA LLC of Janesville, Wis., USA and is sold under the trademark or designation "POLYCARB." The POLYCARB multi-wall honeycomb structures are coextruded polycarbonate sheets. The sheets may be twin-wall, e.g., two layer form, as is illustrated in FIGS. 2 and 3 in which dielectric sheets 13, 14 are respective layers, or may be more than two layers, e.g., three layers 13, 13a, 14 as shown in FIG. 4B, or more.

The electrodes 16 of ionizer subunits 11 are on or at the external surface of a dielectric sheet 13, 14, i.e., not the internal surface of the dielectric sheet that faces directly into or forms channels 20. For a stack of ionizer subunits 11 that form the ionizer assembly 10, it will be appreciated that two electrodes 16a, 16b adjacent a respective honeycomb structure 12 are at the external surfaces of dielectric sheets 13, 14 thereof and those electrodes are relatively uniformly spaced apart from each other over their area by the honeycomb structure 12. Those electrodes 16 are not in the channels 20 and do not make contact with the fluid in the channels. The electrodes that are located between two directly adjacent ionizer subunits may be shared with the two other electrodes at the relative remotely opposite dielectric sheets of those ionizer subunits as is illustrated.

As a non-limiting example, for use with alternating current (AC) voltages in the range of from about 4000 volts to about 15,000 volts rms, a thickness of the honeycomb structure 12 may be approximately 6 millimeters as measured between the external surfaces of the sheets 13, 14. For operation using a direct current (DC) voltage, the ionizer may need a higher voltage to operate, e.g., on the order of from about 15,000 volts to about 20,000 volts. The voltages expressed herein are exemplary only and others may be used to achieve ionization of fluid by the ionizer assembly 10. Exemplary cross sectional size of the channels 20 for such honeycomb may be about 3/16 inch by about 3/16 inch. A smaller size honeycomb structure material from GALLINA USA LLC is 4.5 millimeter thick and may be used, but the smaller cross sectional size channels 20 may cause undesirable back pressure opposing the fluid flow therethrough and also may impede uniformity of fluid flow. Larger size honeycomb structures also are available and may be used.

The sizes and other values expressed herein are examples; others may be used depending on various requirements of the ionizer assembly.

Another example of coextruded twin wall (two layer) polycarbonate sheet material useful as the honeycomb structure 12 is sold under the trademark MAKROLON by Sheffield Plastics Inc. of Sheffield, Mass.; and others are available from TAP Plastics, Inc. and COEX Corporation of Wallyford, Conn. LEXAN polycarbonate material sold by General Electric Company also may be used for the honeycomb structure 12.

An advantage to using polycarbonate material for the honeycomb structure 12 is that it does not support combustion. The cooling provided by fluid in the channels, e.g., air flow or some other fluid, and the tendency for the honeycomb structure to not be combustible, tends to enhance safe operation of the ionizer assembly 10, even at high voltage and/or high frequency operating conditions or uses. Although the ionizer assembly 10 would function as an ionizer at many different voltages, the ionizer assembly is useful at relatively high AC voltages, e.g., from about 400 volts to about 15,000 volts rms or even higher voltages and standard pressure. The ionizer also may be useful at lower voltages, although less sophisticated ionizers may be more cost effective at relatively low voltages. The ionizer also is operative at many different frequencies, even for direct current (DC) circuits; exemplary frequencies are in the range of from about 60 Hertz to about 120 Hertz, but other frequencies may be used. The values mentioned herein are exemplary only and are not intended to be limiting. The ionizer may be operative using a DC voltage input or a pulsed DC voltage input.

A honeycomb structure 12 with ribs 15 providing walls separating respective flow channels 20 prevents an inadvertent or excessive corona within a fluid channel from spreading to another fluid channel. This in combination with the directed fluid flow affected by the channels helps to "blow out" any excess electrical discharge.

The honeycomb structure 12 is available in a number of thicknesses and colors. Some readily available thicknesses include, for example, 4 mm, 6 mm, 8 mm and 10 mm, as measured between the exteriors of the respective sheets 13, 14. Other thicknesses also are possible. The honeycomb structure may be colored or clear. An exemplary honeycomb structure 12 is a clear UV stabilized polycarbonate. The honeycomb structure 12 is available in large sheets and may be cut to desired dimensions. Exemplary standard sheets of the described honeycomb material are available in 4 feet by 8 feet sheets; extended lengths of 20 feet or more may be available. An example of cross-sectional size of the honeycomb structure 12 for the ionizer assembly 10 is 6 inches by 6 inches; however, such sizes are not limiting and it will be appreciated that other sizes may be used.

As is illustrated in FIGS. 1-4, the dielectric sheets 13, 14 of the dielectric honeycomb may be planar or substantially planar. The sheets may have an irregular, e.g., non-planar, surface configuration, e.g., curved as in the illustration of honeycomb structure 12a of FIG. 4. The dielectric sheets 13, 14 of the honeycomb structure 12 are relatively uniformly separated by the ribs 15. The ionizer assembly 10 usually will function best, e.g., substantially uniformly, with the electrodes 16 of respective sheets 13, 14 substantially uniformly spaced apart. By spacing the electrodes 16 uniformly, corona generation is maximized and is uniform, and stress points that would lead to arcing are minimized or eliminated. By eliminating stress points at which arcing could occur, the materials used to form the honeycomb and the electrodes would experience less failure due to thermal break down.

Substantially uniform spacing of the dielectric sheets 13, 14, and substantially uniform spacing of the ribs 15, and, if possible, spacing of the ribs such that the cross section dimensions of the channels 20 are about the same, which together tend to yield uniform channels 20, leads to substantially even fluid flow and substantially uniform cooling effect. Eliminating electrical stress points tends to minimize single point breakdown in structure, and this combination with uniform cooling tends to provide an arc or corona quenching effect, e.g., the blowing out of an electric arc, and tends to maintain even temperatures that protect the material, e.g., plastic or polymer, of which the honeycomb structure 12 is made.

In the exemplary embodiments illustrated, a honeycomb structure 12 with substantially parallel, substantially planar, and overlying or stacked dielectric sheets 13, 14 is used. Though the honeycomb 12 is illustrated as having dielectric sheets 13, 14 of the same thickness, the thickness of the respective sheets 13, 14 does not necessarily have to be the same. However, the thickness of each of the honeycomb structures of the ionizer assembly 10 is substantially the same in the illustrated embodiments. The walls of the dielectric sheets 13, 14 provide in a sense a static, e.g., unchanging, dielectric as compared to the possibly changing ionization and/or dielectric characteristics of the fluid 20a flowing in channels 20. Although the honeycomb structure 12 is illustrated as having two substantially parallel dielectric sheets, honeycomb structure material with more than two dielectric sheets may be used in the ionizer assembly 10, e.g., three or more spaced apart dielectric sheets, which may be in parallel planar and overlying relation. An example of a tri-wall honeycomb structure 12b is illustrated in FIG. 4B having dielectric sheets 13, 14, 13a and ribs 15. Electrodes 16a, 16b are at the exterior surfaces of the exterior dielectric sheets 13, 14. Using tri-wall or even more wall dielectric honeycomb structures provides additional static (unchanging) dielectric for the ionizer assembly 10.

The ribs 15 may be made of dielectric material and may be made of the same material used to make the dielectric sheets 13, 14. The ribs 15 may be substantially planar and arranged substantially perpendicular to the sheets 13, 14, as illustrated. It should be appreciated, however, that the ribs 15 may have alternative configurations. For example, instead of ribs 15 configured as illustrated, tubular structures formed from dielectric material may be disposed between the sheets 13, 14. In such a configuration, the interior space of the tubular structures may define the channel 20. The space exterior to the tubes and between the sheets 13, 14 also may serve as channels 20. In yet another contemplated embodiment, a thin dielectric material may be disposed between the two substantially parallel sheets 13, 14 instead of or in addition to ribs 15. Such dielectric material may be similar to material used to form the sheets 13, 14, or may be another material. Instead of being substantially parallel to the two sheets 13, 14, however, the dielectric material may have a sinus wave shape cross section (similar to corrugated cardboard), a 'zig-zag' shape cross section (similar to the shape of multiple W's), or an alternative configuration. In such a manner, channels 20 may be formed between the sheets 13, 14 in the open areas provided by the ribs and sheets 13, 14. Alternatively, a piece of solid dielectric material could be provided and channels 20 could be drilled or cut in the material.

The ribs 15 tend to hold the sheets 13, 14 relatively uniformly spaced apart and the use of more than two ribs to provide relatively uniform spacing allows for the use of thinner sheets in making relatively large area honeycomb structures 12 than would be possible without more than two ribs. The use of two or more ribs in this configuration also allows for the use of thinner dielectrics or dielectric sheets for a rated voltage of the capacitor. The use of thinner dielectric material for the sheets 13, 14 also may allow for the material to be cooled more easily since the material will have less of a tendency to store heat than thicker sheets and can more easily transmit heat between the electrodes 16 and the fluid 20a, which may remove heat from and, thus, cool the ionizer assembly 10.

Separation of the flow channels 20 from each other may avoid a cumulative heat problem, for example, as follows. Ionization of gas usually occurs more easily at a higher temperature than at a relatively lower temperature, and if the ionizer assembly 10 were to generate heat, heat pockets may form, and resistance to fluid flow due to a heat pocket may build in one or more flow channels 20. The fluid may begin to flow around these areas of higher fluid flow resistance and the ionizer assembly 10 may not be cooled evenly and/or efficiently. As heat builds in an area of the ionizer assembly 10, there may be a tendency for an arc to occur in that area, further raising the temperature of the fluid and the materials in that area, e.g., the honeycomb and/or the electrodes. Hence, the hot spot area may become prone to material breakdown or thermal failure, for example, crystallization, melting, pitting or burning of the electrodes 16 and/or the honeycomb structure 12. By dividing the volume of air space between the dielectric sheets 13, 14 of the honeycomb structure 12 into multiple flow channels 20 and generally maintaining even fluid flow through the flow passages, the tendency to develop such fluid flow resistance may be decreased and the ability to cool and the efficiency of cooling the ionizer assembly 10 may be increased. The fluid flow in these passages tends to be smooth and relatively turbulence free (laminar-like) which enhances cooling efficiency.

As another alternative, the fluid used to cool and/or supply the ionizer assembly 10 may be recycled. For example, the ionizer assembly 10 may be disposed in a closed case, room, closet, etc. in which a recirculating gas is contained. Dry gas, e.g., a gas that contains relatively little or no water (moisture), may be used, for example, because it has a higher ionization potential than humid air or gas. For example, in air the primary gas constituent that requires the greatest voltage for ionization (ionization potential) is nitrogen, oxygen is second, and water is third. Water acts as an electrical conductor and when it is in the gaseous state facilitates electrical conduction in air. Thus, to avoid conducting electricity and the possible formation of an arc discharge in air (or other fluid) flowing through the channels, it is advantageous to minimize moisture in the air. The air may be dried or another gas, e.g., nitrogen that does not contain moisture, may be used. The fluid may be directed through the channels 20 of the ionizer assembly 10, through the case where the ionized fluid may be used to do work or to have some effect, etc., and where the fluid also may be treated, e.g. cooled, dried, filtered, and electrically grounded to reduce its conductivity and potential to arc, etc., and back through the channels 20 of the ionizer assembly. The case may sink heat away from the gas and the ionizer assembly, thereby cooling the entire ionizer assembly 10 and case. Instead of using the case to sink heat, the fluid may be passed through the channels 20 and then through a fluid cooler (e.g., a heat exchanger) before recycling through the channels 20. The case also may provide for electrical grounding to discharge the fluid 20a before being recycled through the ionizer assembly 10 and/or exhausted from the ionizer assembly.

Referring now to FIGS. 5, 6A and 6B, an ionizer subunit 11 is illustrated to show an exemplary method of assembling the ionizer subunits 11 to make an ionizer assembly 10. An electrode 16 is disposed at or near a desired sheet 13, 14 of the honeycomb 12. The electrode is disposed such that at least one layer of dielectric sheet 13 or 14 separates the electrode from the flow through channels 20. The electrode 16 may be a conductive foil, as illustrated; and other examples of electrodes include conductive tape, or plating on the surface of the respective dielectric sheet 13, 14. The conductive foil 16 may be made from a metal such as, for example, aluminum, copper, gold, silver, iron, nickel, tin, or other electrically conductive material. Alternatively, the electrode 16 may be an electrically conductive paint containing electrically conductive material, such as metal, e.g., Rust-Oleum cold galvanizing, which contains 93 percent (93%) zinc, and/or non-metal additives. Virtually any electrically conductive material of suitable size and shape may be used for the electrode 16. The electrode may be thin and conformal so it tends to follow irregularities in the adjacent dielectric sheets and minimizes space needed for the electrode between dielectric sheets of respective honeycomb structures.

The electrode 16 may include an adhesive 25 to facilitate attachment to a respective sheet 13, 14 or an adhesive 25 may be located on a sheet and used to adhere the electrode to the sheet. An advantage of using adhesive backed electrically conductive tape is the cushion effect of the adhesive, which helps fill voids and, thus, enhances conformance to irregularities in the dielectric sheet. Instead of, or in addition to adhesive, the sheets 13, 14 may be provided with mechanical connectors that mechanically engage the electrode or reciprocal connectors on the electrode 16. Alternatively, the electrode 16 may be taped or otherwise fastened in the correct position or held in place by an adjacent ionizer subunit 11. Other possible methods of locating the electrode 16 at a sheet 13, 14 will occur to those skilled in the art and are intended to be included in the scope of the appended claims. In an optimum circumstance, for example, the electrode 16 would be between two dielectric sheets of respective ionizer subunits 11, and there would be no voids or space, etc. between the confronting surfaces of those two dielectric sheets. By avoiding such voids or space, the likelihood of corona discharge or electric arc formation therein is avoided.

In the illustrated embodiment of FIGS. 5 and 6, for example, an ionizer subunit 11 includes a conductive foil used as the electrode 16. The conductive foil 16 includes an adhesive 25 on the surface that contacts a respective sheet 13, 14. The conductive foil 16 may be disposed at a desired sheet 13, 14 with an excess material portion 26 extending beyond an edge 27 (e.g., the tab edge where the tab 18 of the electrode may be exposed) of the honeycomb structure 12 (see FIG. 5). The excess material portion 26 may be used as a tab portion 18a, 18b (FIG. 1). As seen in FIGS. 6A and 6B, the excess material portion may be folded along the edge 27 of the honeycomb structure with the adhesive 25 facing the edge 27 of the honeycomb structure.

As is seen in several drawing figures, the electrode 16 is positioned in spaced apart relation from three of the side edges 28 of the honeycomb structure 12, as is represented by space 28a, to avoid electrical leakage from one electrode to another electrode around the edge of the honeycomb dielectric 12.

Referring now to FIG. 6B, before the excess material portion 26 (also referred to as "tab portion" or "tab edge" 27) contacts the honeycomb structure 12, a dielectric insulator material spacer 30 may be placed between the honeycomb structure edge (tab edge) 27 and the excess material portion so that it straddles the two adjacent honeycomb structures 12, as is seen in the drawing figure. The dielectric insulator 30 may be made from any suitable material (e.g., plastic, thermoplastic, glass, clay, ceramic, etc.). As an example, the dielectric insulator 30 may be cut from a thin (e.g., from about 0.127 millimeters or less to about 0.254 millimeters or more thick) sheet of MYLAR® film. Other insulators of the same or different sizes may be used as insulator 30. The dielectric insulator 30 may, for example, reduce the likelihood of unwanted electrical leakage between the tab portion 18 of one electrode and the next adjacent electrode of the opposite polarity, e.g., from the electrode 16 of one ionizer subunit 11 and the electrode 16 of an adjacent ionizer subunit 11.

Instead of folding the excess material portion 26 at this point, a plurality of ionizer subunits 11 may be assembled in overlying relation, e.g., as is seen in FIG. 1, and the excess material portions 26 may be folded after the ionizer subunits have been assembled together as in the arrangement of tabs 18a, 18b, for example. Alternatively, the excess material portion 26 of some or all ionizer subunits 11 may be folded prior to assembly (stacking) and the excess material portion 26 of some or all ionizer subunits 11 may be folded after stacking to form the ionizer assembly.

Each ionizer subunit 11 may be made in the same manner and with the same configuration. This would facilitate production of the ionizer subunits and may help increase overall quality and consistency of the ionizer subunits and the ionizer assemblies 10.

Figure 7A:
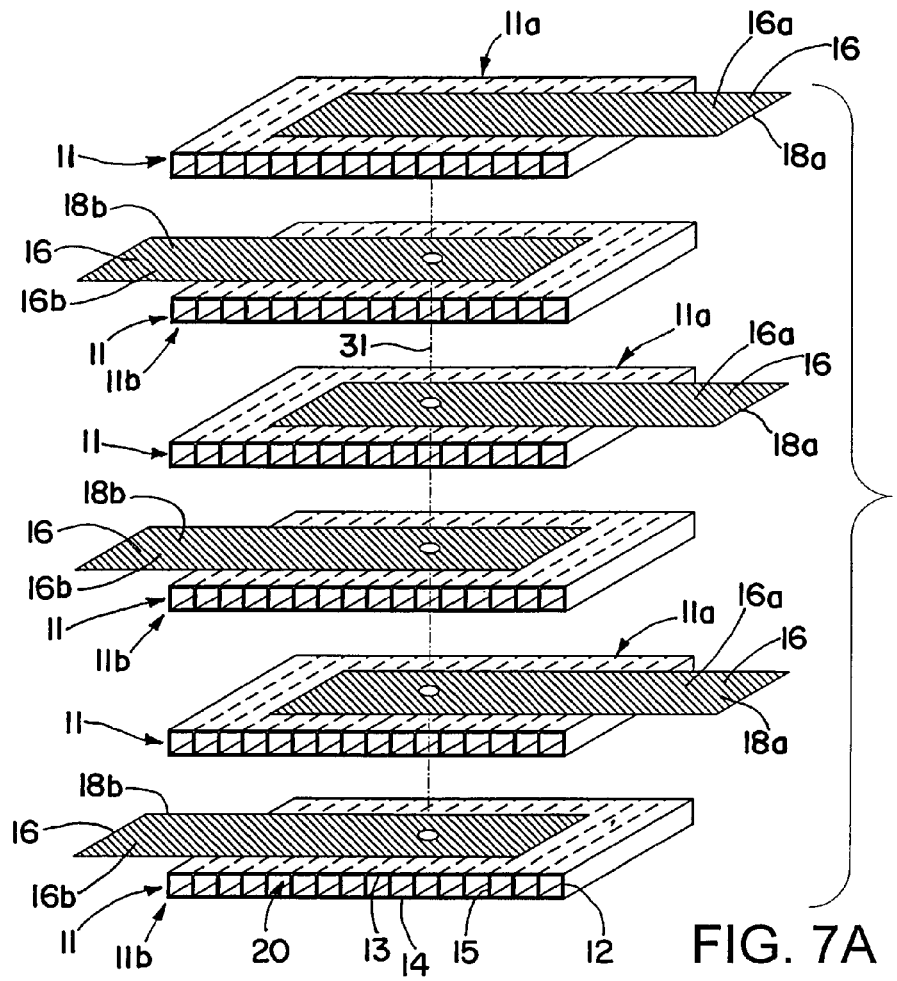
FIGS. 7A and 7B are a schematic illustrations respectively showing a number of ionizer subunits aligned to be assembled in a stack and assembled in a stack to depict an exemplary method of assembling ionizer subunits to make an ionizer assembly.
Figure 7B:
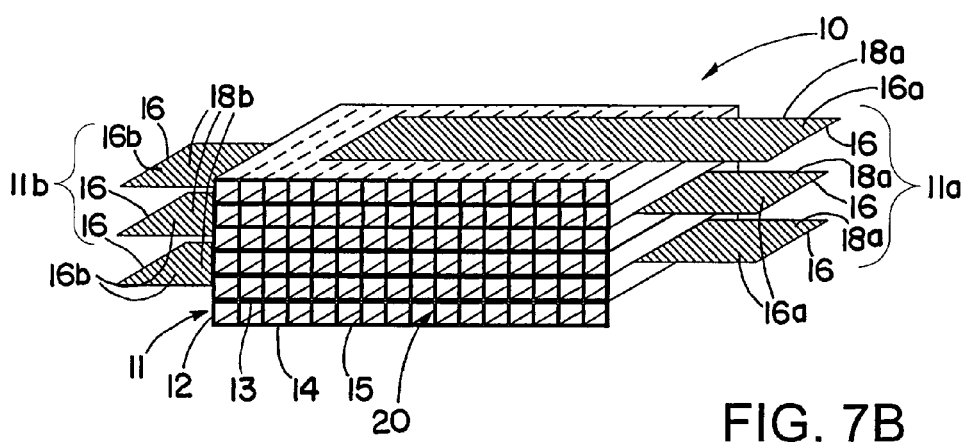

Referring now to FIGS. 7A and 7B, a method of assembling ionizer subunits 11 into an ionizer assembly 10 is shown. It should be noted that some of the following steps may be performed in an alternative order and are set forth in the illustrated order only for convenience of description.

A plurality of ionizer subunits 11 is shown. In the illustrated exemplary ionizer assembly 10, six ionizer subunits 11 are provided. Starting at the top of FIG. 7A, a first ionizer subunit is provided and may be arranged as illustrated. A second ionizer subunit is provided in parallel to the first ionizer subunit but is oriented in reverse direction to the first ionizer subunit, e.g., rotated 180° (180 degrees) about an axis 31 relative to the adjacent ionizer subunit. Third, fourth, fifth and sixth ionizer subunits 11 are in the same alternate relational orientation as the first and second ionizer subunits 11. The ionizer subunits 11 are stacked together and are held together to make the ionizer assembly 10. The steps may be repeated until an ionizer assembly 10 of desired characteristics, dimensions and layers is formed. The stacked assembled ionizer subunits are shown in FIG. 7B prior to folding over or otherwise attaching respective electrodes 16a to each other and electrodes 16b to each other. A piece of honeycomb 12 without an electrode 16 may be placed at the top and/or bottom of the ionizer assembly 10 to function as a top and/or base (not illustrated). Other top and base members may be used, as may be desired.

Thus, it will be appreciated that the respective electrodes 16a and their associated tabs 18a may be exposed at one part of the ionizer assembly 10 and the respective electrodes 16b and their associated tabs 18b may be exposed at another part of the ionizer assembly 10, not in direct electrical connection with the electrodes 16a. In this way it is relatively easy to electrically couple respective electrodes 16a together and to the electrical circuit 19 and respective electrodes 16b together and to the electrical circuit 19.

In the illustrated embodiment of FIG. 1 the ionizer assembly 10 is generally of rectangular cross section and the tabs 18 of respective electrodes are exposed at opposite sides of the rectangle. As also is illustrated in FIG. 14, the tabs 18 of respective electrodes 16 may be exposed at adjacent sides of the rectangular cross section ionizer assembly. Separation of the respective electrodes and their tabs by locating them at different respective sides of the ionizer assembly 10 and by spacing the electrodes 16 from the edges of the dielectric honeycomb may facilitate constructing the ionizer assembly, maintaining electrical isolation of the electrodes 16a from electrodes 16b, and may also provide for enhanced accurate control of the ionizing function provided by the ionizer assembly 10. It will be appreciated that although the ionizer assembly 10 is shown in the several embodiments as having a rectangular cross section or footprint, it may have another shape, e.g., a different polygonal cross section or footprint or even a curved cross section or footprint, such as circular, oval, etc. or may be curved as in FIG. 4A.

As shown in FIG. 7B, the channels 20 of ionizer assembly 10 may be similarly oriented to pass fluid through the ionizer assembly 10 in one direction.

As shown in FIG. 8, the channels 20 of ionizer subunits 11 of ionizer assembly 10 may be oriented with some flow channels 20 in different respective directions, e.g. orthogonal directions.

As shown in FIGS. 9 and 10, ionizer subunits 11 may be joined together with a suitable fastening mechanism 32. The fastening mechanism 32 may be, for example, an adhesive (e.g., epoxy, silicone, foam tape, etc.), tape or other material such as one or more straps (FIG. 9), a bolt or screw (FIG. 10), one or more bands of metal or other material (electrically conductive or non-conductive), a clamp, pressure fitting, or other suitable means. The ionizer subunits 11 may be pressed or squeezed together in a stack to make the ionizer assembly in a manner that minimizes the amount of ionizable material between the ionizer subunits 11. By reducing the amount of ionizable material from the space between adjacent ionizer subunits 11, unintended corona generation and/or electric arc in that space may be reduced or avoided. An insulator material, e.g. silicone, may be included between the ionizer subunits 11 further to occupy any such space and to reduce the amount of ionizable material, e.g. air, between ionizer subunits. If such insulation material were curable, settable or the like, it may be used to glue, cement, etc., the parts of the stack of ionizer subunits 11 forming the ionizer assembly 10 together.

Figure 11:
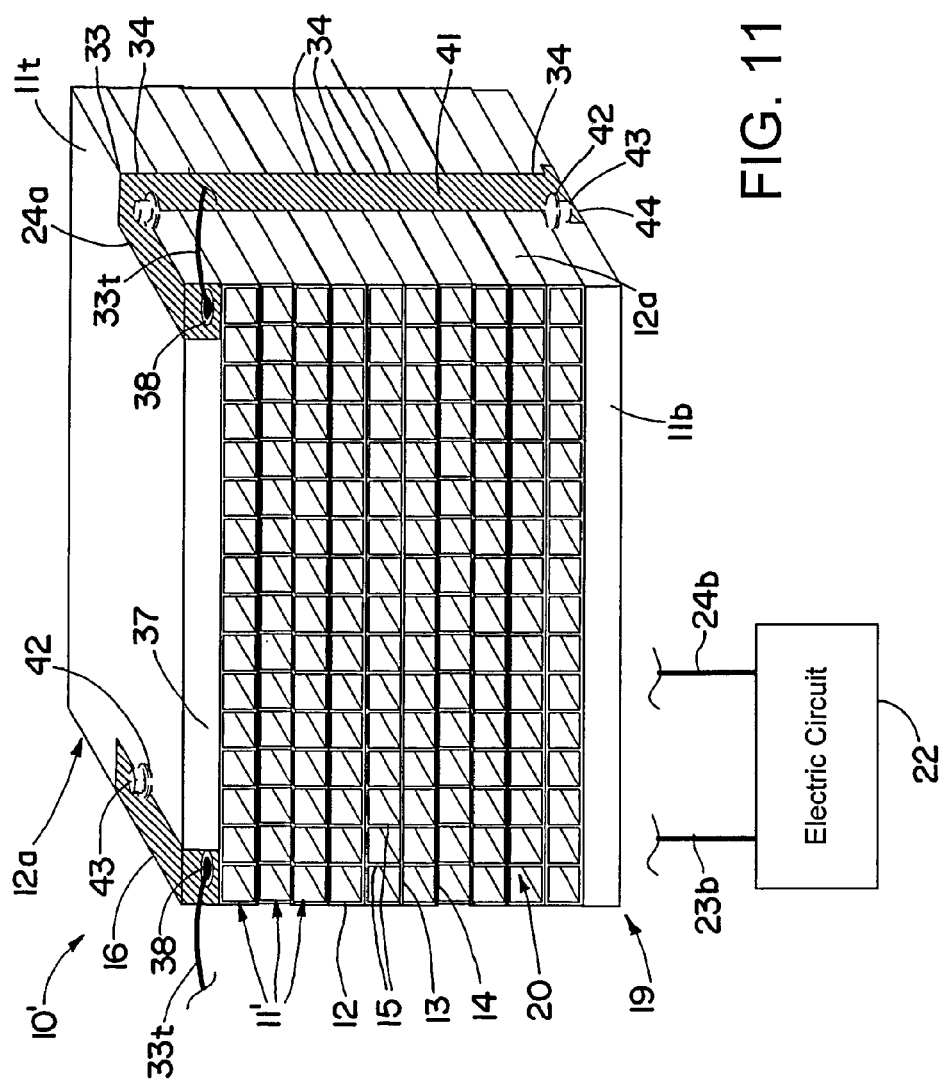
FIG. 11 is an isometric view of an ionizer assembly according to another embodiment of the present invention.
Figure 12:
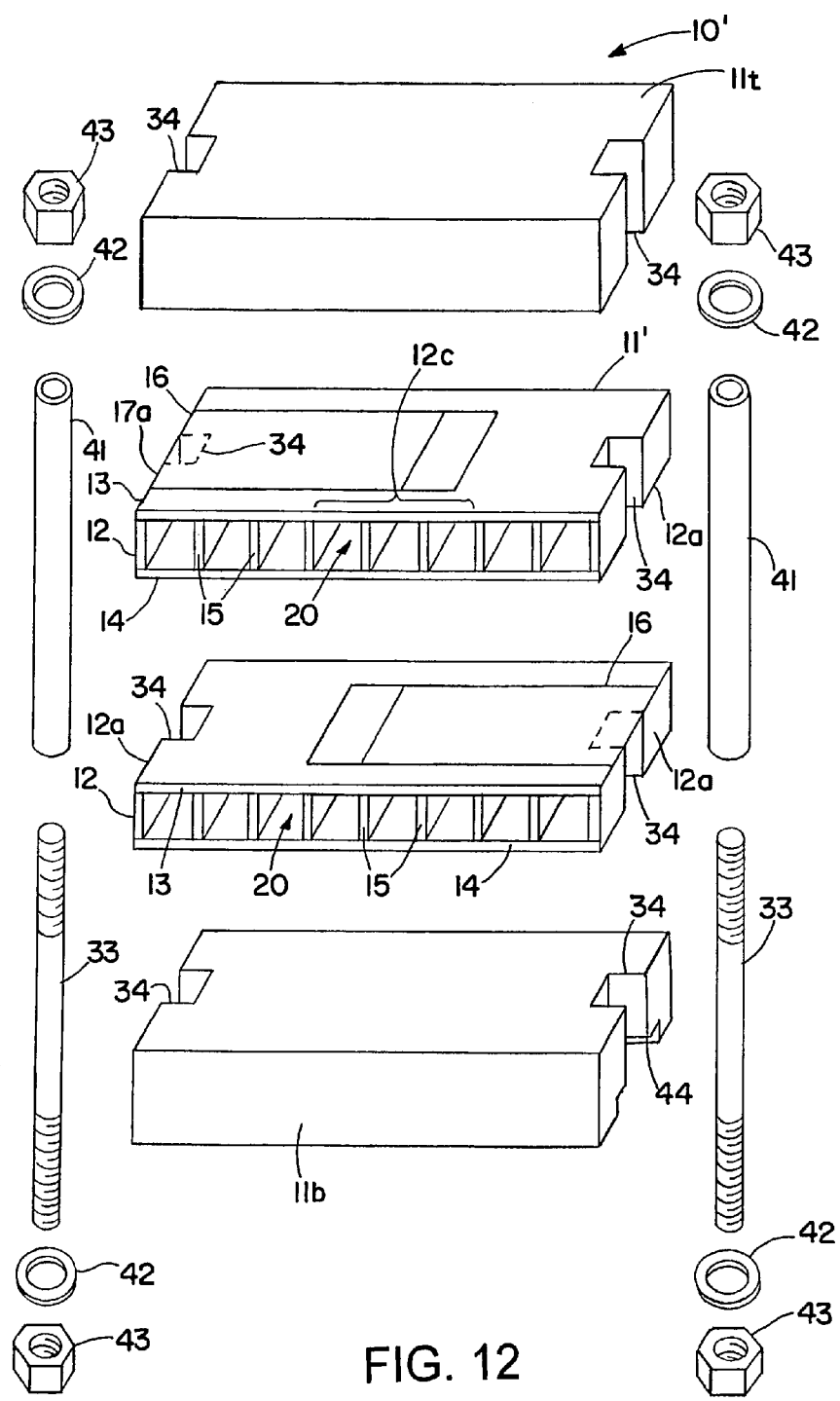
FIG. 12 is an exploded schematic illustration of an ionizer assembly with parts arranged to depict an alternative method of assembling a number of ionizer subunits.
Figure 13D:
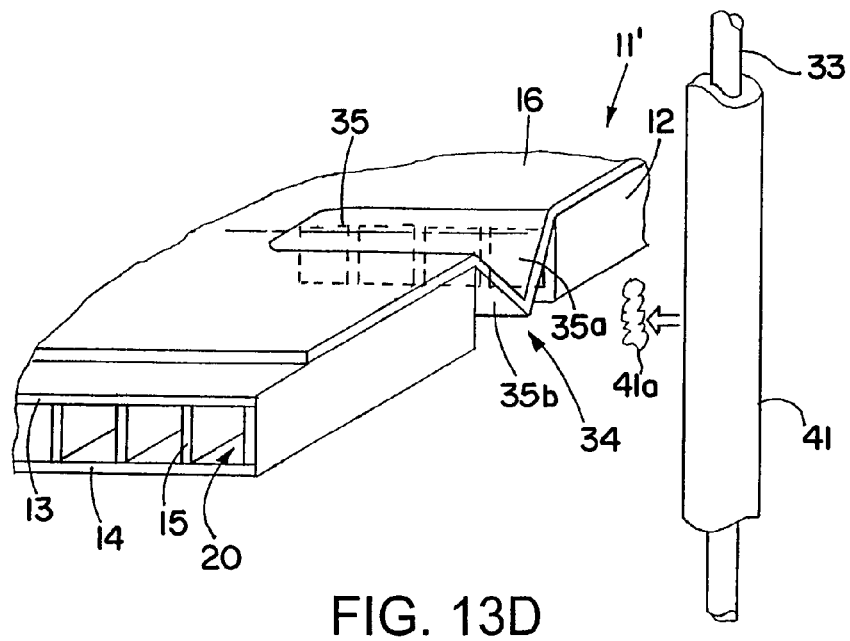

Referring now to FIGS. 11-13, an alternative embodiment of ionizer subunits 11' and ionizer assembly 10' and method of assembling the ionizer assembly 10' are illustrated.

As is seen in FIG. 11, the ionizer assembly 10' includes a number of ionizer subunits 11' that are in stacked relation generally as described above. As is described in further detail below with respect to FIGS. 11-13, the ionizer subunits 11' of the ionizer assembly 10' are held together between a base member 11b and a top member 11t by a number of rods 33 or other elongate fasteners. In the exemplary embodiment of FIG. 11 there are two rods 33 that are threaded at opposite ends, and a nut 43 threaded onto each end holds the rods to the base member and top member with the stack of ionizer subunits 11' pressed or squeezed together between the base member and top member. The rods may be located in notches of the ionizer subunits 11' to tend to restrict lateral movement of the ionizer subunits in the stack of them in the ionizer assembly 10'. Also, the rods may be electrically conductive and may be electrically connected to respective electrodes 16 of the ionizer subunits 11' to provide electrical connections thereof in an electrical circuit, such as, for example, the electrical circuit 19 of FIG. 1. For example, one electrically conductive rod may be electrically connected to the electrodes 16a and a different electrically conductive rod may be electrically connected to the electrodes 16b, thereby providing the two polarities of electrical connection for the respective electrodes of the ionizer assembly 10'. Terminal electrodes 33t at the top member of the ionizer assembly 10' may be used to provide electrical connections for the electrically conductive rods to the electrical circuit 19 (FIG. 1).

As shown in FIGS. 11-13, a notch 34 cut into each side edge 12a of the honeycomb structure 12 is approximately midway along the length of the side edge. "Side edge" in this instance refers to the edges 12a of the honeycomb structure that run parallel to the flow-through channels 20; placing the notch 34 at such side edge 12a avoids obstructing fluid flow through channels 20 at the central area 12c of the ionizer assembly 10' where there may be more heating than at the edges 12a of the ionizer assembly during use. In the illustrated embodiment, the notch 34 is about one fourth inch (¼") wide, measured on the side edge 12a of the honeycomb 12, and one half inch (½") deep, measured from the side edge 12a toward the center area 12c of the honeycomb 12. An electrode 16 is located at a sheet 13, 14 and extends out to the edge 12a of the honeycomb structure, including electrode material extending over the notch 34. The electrode may be an electrically conductive foil, electrically conductive tape, electrically conductive paint, plating, or other material, e.g., as is described elsewhere herein and/or equivalents. A cut 35 is in the electrode 16 extends approximately along the depth of the notch and is approximately centered on the width of the notch. Two flaps 35a, 35b of material that are part of the electrode 16 are formed by the cut 35 and may be manually or otherwise depressed slightly into the notch toward the other sheet of the honeycomb structure 12. This depression biases bending or folding of the flaps into the notch to ensure that as the rod is pressed into the notch 34 and the rod and/or an associated sleeve makes electrical connection with the electrode 16, so that adhesive, which may hold the electrode to the honeycomb structure 12, would not be between the electrode and the rod or sleeve. A number of ionizer subunits 11' and connection of electrodes 16 thereof in the electrical circuit 19 may be made and provided according to this method.

Figure 13E:
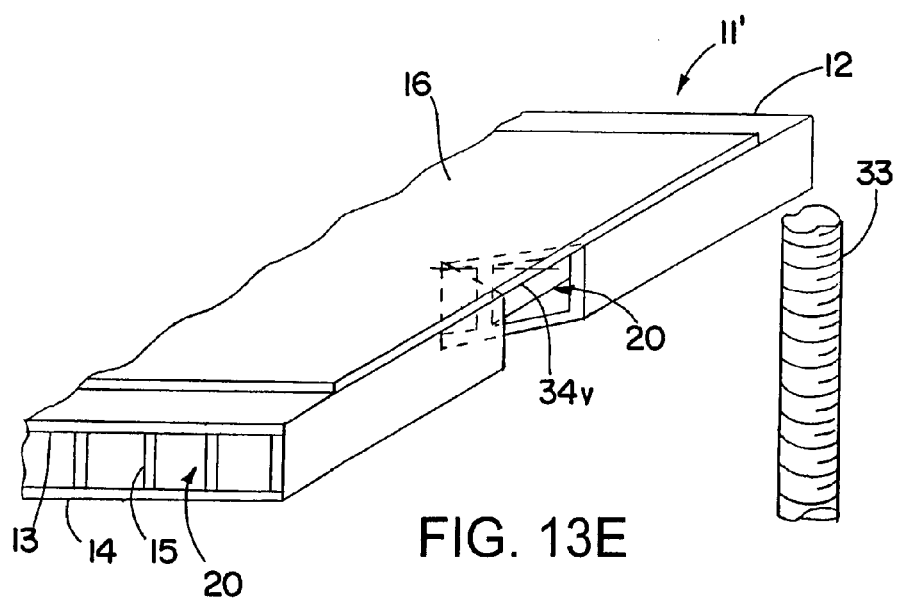

In the embodiment of FIGS. 12 and 13A-13D the notch 34 is rectangular cross section. In the embodiment of FIG. 13E the notch 34v is V-shape. Using a V-shape notch helps to avoid the possibility that the flaps 35a, 35b might be stressed and tear where they are attached to the main body of the electrode material in the area of the notch.

According to the illustrated embodiment of FIGS. 11-13, the ionizer subunits 11' may be assembled in stacked relation between a base 11b and a top 11t to form an ionizer assembly 10'. The base may be made, for example, from polypropylene. In the illustrated embodiment, for example, the base and the top are each ½" (½ inch) thick polypropylene sheets. Notches 34 are cut or otherwise formed in the base 11b and the top 11t with dimensions substantially similar to the notches 34 in the sheets of honeycomb 12. Each successive ionizer subunit 11' is oriented about 180 degrees (180°) relative to adjacent ionizer subunit 11' so that the electrodes 16 of alternate, every second, ionizer subunit align in the same direction. A desired number of the ionizer subunits 11' may be stacked in this manner.

After the ionizer assembly 10' components are in their appropriate configuration (orientation), they may be mechanically and electrically connected to form a functioning ionizer assembly 10'. Threaded rods 33 are provided for this purpose. If desired, around at least a portion of the rod 33 there may be placed an electrically conductive engaging material 41. This conductive engaging material may be, for example, a piece of conductive foil or a conductive sleeve. The threaded rod 33 is inserted through the sleeve 41 and the assembly is pushed into the notches 34 formed in the base 11b, the top 11t and the ionizer subunits 11'. As illustrated in FIGS. 13A-13D, as the rod 33 and the sleeve 41 are pushed into the notches, the flaps 35a, 35b of the electrodes 16 are pushed into the notch and make contact with the sleeve. In this way, each ionizer subunit 11' is connected to the sleeve 41. The sleeve 41 and the rod 33 may be selected so that the outer diameter of the threaded rod 33 is approximately identical to the inner diameter of the sleeve 41 for electrical connection therebetween. Hence, the rod and the sleeve will be electrically connected so the rod is electrically connected to each ionizer subunit 11' electrodes 16. The notch may be V-shape, as at 34v to avoid a tendency of the flaps 35a, 35b to tear as they are folded under the force of the inserted rod.

If desired, electrically conductive material 41a, e.g., some slightly crushed aluminum foil (FIG. 13D) or the like, may be inserted in the notch 34 or 34v prior to insertion of the rod and sleeve or just the rod to increase electrical connection thereof to the electrodes; such electrically conductive material may be further crushed or wedged into the notch as the rod and sleeve or just the rod is forced into the notch.

In the illustrated exemplary embodiment the threaded rod 33 approximately is the same height as the ionizer assembly 10', as shown. A washer 42 and a nut 43 may be attached to each end of the rod 33 to join and hold the ionizer assembly 10' together in operational relation. The rod may be a bolt to hold the stacked ionizer subunits together between the bolt head at one end and washer and nut at the other end. Other devices, such as clamps, rivets, tape, bands, etc., e.g., as are described herein, alternatively or additionally may be used to hold the parts of the ionizer assembly 10' together. The use of rod 33, sleeve 41, washer 42 and nut 43 can be suitably tightened to hold the parts of the ionizer assembly 10' securely together, e.g., to press or to squeeze these together, to tend to minimize air or other fluid in areas where not desired, e.g., between an electrode and the sheet material of a honeycomb structure or between sheet material of respectively adjacent honeycomb materials and between the top and bottom ionizer subunits and the top and base of the ionizer assembly 10'.

A recess 44 in the base 11b allows for recessing the end of the threaded rod 33, the washer 42 and the nut 43 from the surface of the base and allow for a flat surface on the bottom of the ionizer assembly 10'. In the illustrated embodiment, the recess is formed by making a groove approximately ¼" (one fourth inch) deep and about 7/16" (seven sixteenths inch) wide across the base 11b in a straight line from approximately the midpoint of one side to the midpoint of the opposite side of the base. The groove is centered over the notches 34 or 34v. Using a groove, instead of a more traditional recess such as, for example, a wide hole around the washer and nut, allows for lower tolerances since the rod can shift in toward the center of the ionizer assembly 10' (providing improved electrical contact with ionizer electrodes) or out toward the edge without having to adjust the recess location. The recessed nut and bolt allow the base to be flat to rest securely on another surface on which it is placed, if desired.

The ionizer assembly is self-supporting structure even by its own dielectric, e.g., the honeycomb structure and/or in that the components are retained together as described and also the top and base facilitate supporting the ionizer assembly on a surface, in a case, etc., and stacking of capacitor assemblies, as well as side-by-side placement.

The rod 33 and, if used, the conductive engaging material 41 are selected so the outer diameter of the rod and engaging material is approximately equal to the width of the notches 34. When the rod and engaging material firmly engage the notch and the ionizer components in stacked relation, no or extremely limited movement is possible in the vertical and horizontal directions, keeping the entire ionizer assembly 10' in the illustrated operational configuration. Also, the base 11b and top 11t members protect the ionizer from physical damage, electrically insulate the top and bottom, and may facilitate securing the ionizer assembly 10' in a machine or other support structure, case, etc., without damaging what may be more fragile material of the respective ionizer subunits 11'.

In FIG. 11 at the top 11t is conductive tape or other electrode or electrical conductive member 33t that may facilitate making electrical connections to the rod 33. The conductive tape 33t type electrical connection may be adhered to the top surface and to a front edge 37 of the top 11t. The conductive tape 33t is in electrically conductive engagement with the washer 42 and nut 43. Electrically conductive screws 38 may be screwed into the top or front edge 37 of the top 11t through the conductive tape 33t to serve as a terminal connection for wires 23a, 24a for connection of the ionizer assembly 10' in the electrical circuit 19.

Referring now to FIGS. 14-17, various features of the ionizer assemblies 10, 10' and components thereof are shown. These features may be employed in the described and illustrated embodiments as well as equivalent structures.

As shown in FIG. 14, alternative placement configurations are possible for an electrode 16 at a sheet 13, 14 of a honeycomb structure 12. In FIG. 14, the electrode 16 of one ionizer subunit 11 is oriented about 90 degrees (90°) relative to the electrode 16 of a second ionizer subunit 11. The capacitive effect of an ionizer assembly 10 made from the two illustrated ionizer subunits 11 would be substantially similar to the effect created by two ionizer subunits 11 assembled according to the method described above with respect to FIGS. 5 and 6A.

As shown in FIG. 15, alternative electrode 16 patterns are possible. In FIG. 15, the electrode 16 is provided with a narrow connection tab 46 e.g., narrower in width than the illustrated wider main part of the electrode 16 that provides input via the honeycomb to the fluid 20a in the channels 20. A tab 46, or a similar configuration, being of relatively narrow width may be beneficial to simplify electrical connection of an ionizer assembly 10 avoiding obstructions external of the ionizer assembly 10. Alternatively, there may be no excess material portion 26 and instead the tab 46 may be replaced by a wire electrically connected to the electrode 16 of desired ionizer subunits 11 and may extend for electrical connection to an electrical circuit.

As shown in FIG. 16, the fastening mechanism 32 may include the use of a conductive bolt or screw 32s that pierces through the electrode 16 on the honeycomb structure 12 and electrically connects to the electrode 16. In this manner, the fastening mechanism 32 may be used to electrically connect the electrodes 16 of a desired number of ionizer subunits 11. For example, a long screw 32 may be used to connect all of the ionizer subunits 11 of an ionizer assembly 10 and in particular provide electrical connection to desired electrodes 16. Electrical connection of the electrodes in an electrical circuit 19 (FIG. 1) may be provided via the screw 32s; the screws act as terminals 23a, 24a of FIG. 1. In operation a charge may be applied to the electrodes 16a, 16b directly via the screws 32s. In FIG. 16, the electrodes 16 may be electrically conductive paint, electrically conductive plating, etc. Such an electrode material may be used in other embodiments hereof. As shown in FIG. 16, the screw 32s pierces and electrically connects with electrically conductive paint 16 to create an electrical connection between the screw and the conductive paint.

In FIG. 17, the electrode 16 is provided with a rounded edge 47. Corners create electrical stress points. By eliminating corners on the electrode 16, high electrical stress points may be reduced and the possibility for occurrence of undesired corona discharge may be reduced.

FIG. 18 is a schematic illustration of a part of an ionizer assembly 10 having a number of flow channels 20 through which fluid 20a flows in the honeycomb structures 12. Electrodes 16 apply voltage across the fluid 20a causing the fluid to become ionized. In a sense it appears that portions of the fluid may become positively charged ions, as is represented by the positive (+) signs near one wall of the illustrated top walls of the channels 20; and negatively charged ions, which are indicated by negative signs (−), tend to move toward the bottom walls of the channels. The fluid output 20' from the channels 20 includes respective ions. As the fluid flowing through the channels flows in a laminar fashion, the fluid output 20' tends to maintain that laminar flow and, therefore the respective positive and negative ions remain separated for some distance, e.g., 20-30 feet, from the outlet of the ionizer assembly 10. The foregoing separation may be enhanced by providing the fluid flow through the channels at a flow rate such that the residence time for fluid therein is approximately the same as one half cycle of input AC voltage to the electrodes so that there is minimal reversal of ions in the channels, e.g., minimal movement of ions from the top wall to the bottom wall and vice-versa, etc.

Figure 19:
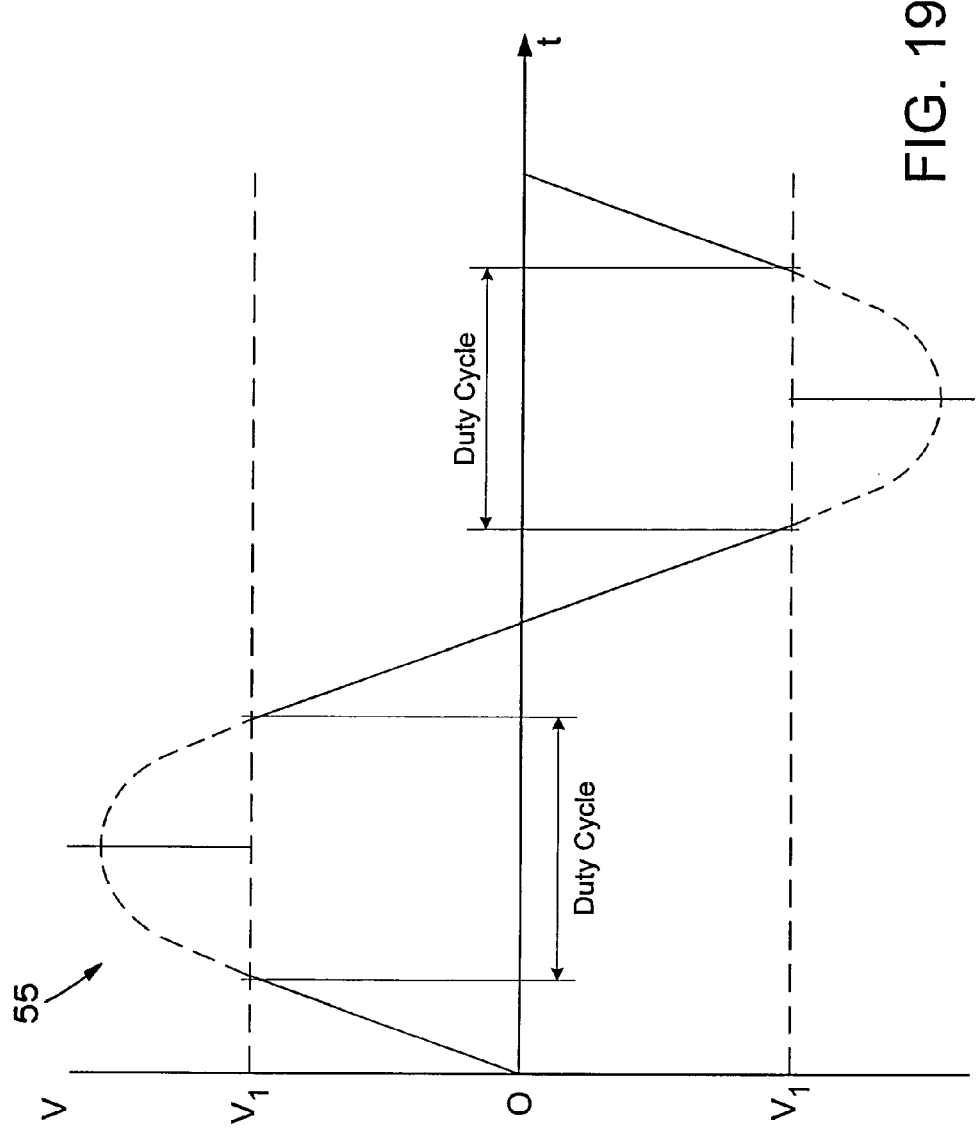
FIG. 19 is a representation of an AC electrical voltage input to an ionizer as a function of time indicating an example of a portion of the input voltage having a magnitude that exceeds the break down voltage level of the fluid used in the ionizer.

Referring now to FIG. 19, a chart illustrates voltage as a function of time of a functioning ionizer 10, 10'. A high voltage from an AC source is applied to the ionizer. FIG. 19 depicts one cycle of operation: as the voltage rises from 0, the ionizer begins to store energy. When behaving as a capacitor, the voltage is approximately equal to the break down voltage of the supply fluid, e.g., air or other fluid (referred to below as "break down voltage"). As used in an ionizer the voltage is adequate such that the ionizer generates a corona in the supply fluid. Corona discharge continues in the fluid until the applied voltage drops below the break down voltage. If the intersections of the applied voltage and break down voltage lines are projected onto the time line in FIG. 19, the time the ionizer could generate a corona during each cycle of the AC source may be calculated. There will be two periods of time per cycle of the AC source, the first time period represents corona generation at the positive break down voltage, and the second time period represents corona generation at the negative break down voltage. Duty cycle consists of these two time periods added together. Duty cycle is the time per cycle of the AC source that the ionizer assembly could generate a corona. The duty cycle may be multiplied by the frequency of the applied AC source to determine the total operation time per second or minute, etc.

The ionizer assembly 10, 10' may function as an ionizer or as a capacitor, which may be determined by adjusting the flow rate of air 20a (or other fluid) flowing through channels 20. Whether the ionizer assembly 10, 10', functions as an ionizer or as a capacitor may be determined by adjusting the flow rate (one complete replenishment of air in the flow channels 20) relative to the duty cycle. The time it takes for one complete replenishing of air (or other fluid) in the flow channels also may be referred to as the residence time. If the flow rate is approximately equal to or greater than the duty cycle, the unit 10, 10' functions as a capacitor by blowing out the electrical arc or corona discharge, e.g., because the electrical arc or corona discharge or the start of fluid breakdown and, thus the tendency to create an electrical arc or corona discharge in the fluid quickly is blown out of the flow channels 20. If the flow rate is less than the duty cycle, the unit 10, 10' functions as an ionizer by creating or promoting corona discharge in the fluid 20a and, thus, ionizing the fluid or at least some of the fluid in the flow channels 20.

Other factors that may determine whether the ionizer assembly functions as an ionizer or as a capacitor may include, for example, voltages, duty cycle, and/or frequency of the input power supply to the ionizer assembly, the thickness of the honeycomb 12, the material of which the honeycomb is made, the dielectric characteristics of the honeycomb and/or the fluid 20a, the material used for the electrodes 16, and possibly other factors.

Figure 20:
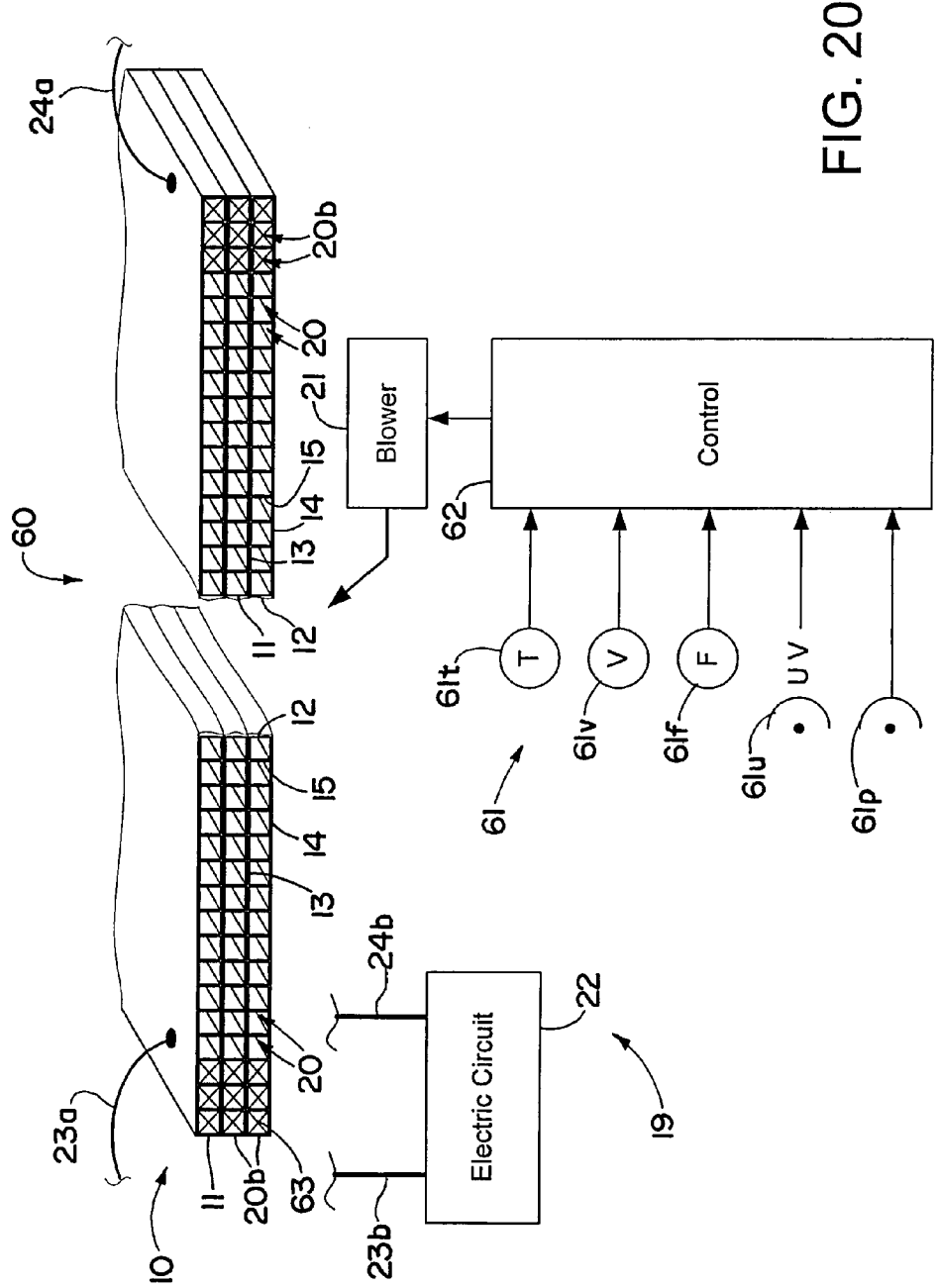
FIG. 20 is a schematic illustration of an ionizer in which a number of flow-through channels are blocked and also showing an exemplary control and blower.

Referring now to FIG. 20, a fragmentary view of an ionizer assembly 10 in an ionizer system 60 is illustrated. The ionizer system 60 includes the ionizer assembly 10, blower 21, sensors 61, and control 62. Several of the fluid flow channels 20b are blocked by suitable blocks, e.g., sheet material, putty, clay, or other material 63 to block air or other fluid from being blown therethrough by the blower 21 if those flow channels are not needed for cooling and the electrodes 16 do not overlie those flow channels. Therefore, as the blower 21 blows air or other fluid (or as a pump 21a (FIG. 1) pumps fluid), through the unblocked channels 20, such flow is directed to the area of the ionizer assembly 10 where the ionizers 17 is formed and where the fluid may be more needed to provide cooling effect than areas where there is substantially no capacitance, e.g., where electrodes of adjacent ionizer subunits 11 or 11' do not have overlap of respective electrodes.

As is illustrated schematically in FIG. 20, the sensors 61 include a temperature sensor 61t, voltage indicator, voltmeter or the like 61v, and frequency sensor 61f. If desired the voltage indicator 61v may be a device that sets the voltage at which the ionizer assembly 10 is operated or may be a device that measures the voltage across the ionizer assembly 10, for example, as it is in use in an electrical circuit 19 (FIG. 1). Similarly, the frequency sensor 61f may be a device that sets the frequency at which the ionizer assembly 10 is operated or may be a device that measures the frequency of the electrical input to the ionizer assembly 10, for example, as it is in use in an electrical circuit 19 (FIG. 1). The sensors also may include one or more light sensors, such as a photosensor, photocell or other visible light sensor 61p and a photosensor for sensing excessive light given off by arcing. There also may be an ultraviolet light sensor 61u.

The control 62 may be a digital control, computer control, other electronic circuitry, programmed logic device, etc. to determine operation of at least part of the ionizer system 60, for example, as is described below. It will be appreciated that the description with regard to FIG. 20 may be applied similarly to the other embodiments and illustrations herein. For example, although the description pertains to use of a blower 21 for blowing air, it will be appreciated that the blower may blow other gas, vapor, or other fluid and/or the pump 21a may be operated similarly with regard to a fluid, whether liquid, gas, vapor, etc.

It is possible that during operation of the ionizer assembly 10, as is illustrated in FIG. 20, there will be the occurrence of an electrical effect, such as an electric arc. Such electrical effect may have one or more deleterious affects on the ionizer assembly 10; several of these, for example, include generating excessive ultraviolet radiation (light) or generating heat. These may cause premature degradation of material of which the ionizer assembly 10 is made or the overall system or device in which the ionizer assembly 10 is used. The ultraviolet light sensor 61u may sense such UV light and provide input to the control 62 to increase blower 21 speed to increase flow of air 20a, for example, through channels 20 to tend to blow out the arc.

In operation of the ionizer assembly 10, as illustrated in FIG. 20 (and also in other drawing figures also as ionizer assembly 10', for example), the ionizer assembly is electrically connected in the electrical circuit 19 to receive electrical charge and to function as an electrical ionizer. The blower 21 blows air through respective fluid flow passages 20 to cool the ionizer assembly. The blower speed and/or the volume of cooling and/or supply air and/or the flow rate of the cooling and/or supply air may be controlled by the control 62 that controls operation of the blower speed, output volume, etc. The temperature sensor 61t may be strategically positioned relative to the ionizer assembly 10, e.g., at the ionizer area 17, at the outlet of one or several flow passages 20, or at some other location to detect the temperature of the ionizer assembly or a temperature representative of the ionizer assembly, thereby to determine in effect the heating that is occurring during operation. The control may respond to such temperature detection and, accordingly, may be programmed to effect appropriate operation of the blower 21 to maintain a given temperature, to avoid exceeding a maximum temperature, to effect a given amount of cooling, etc. For example, if the detected temperature were to exceed a predetermined level, the blower 21 may be operated by the control 62 to increase the cooling of the ionizer assembly 10. As was mentioned above, electrical arcing tends to occur more easily at higher temperatures than at lower temperatures, and the occurrence thereof may tend to cause a further temperature increase of the ionizer assembly 10. By increasing the cooling of the ionizer assembly 10, the extent of such arcing can be decreased as will its contribution to heating. As the temperature decreases, the control 62 may reduce the blower output speed, air flow output, etc. and, thus, reduce power requirements of the ionizer system 60.

In the present invention, if it were desired to eliminate arcing in fluid in the flow passages 20 and/or at least to try to reduce or to minimize the occurrence of such arcing, the blower output may be adjusted, e.g., increased to ensure that the flow rate of fluid in the flow through channels 20 is relatively fast at or near flow required to fill ionizer volume for one half duty cycle so that any electrical arc that would tend to occur in the channel would be blown out of the channel before a substantial amount of charring damage, etc. has occurred. As an example, since the electrical input to the ionizer assembly 10 ordinarily would be an alternating current (AC) signal (voltage) of a given frequency, it would be advantageous to avoid or to tend to minimize arcing of fluid in the channels 20 by using a flow rate through the channels that is at least as fast as one half the duty cycle of the mentioned AC signal. According to this example, if the AC signal were at 60 Hertz, one half cycle requires about eight milliseconds; so the flow through the channels 20 would be at a speed that takes approximately less than 8 milliseconds to change the air in each channel or faster to tend to minimize the exposure of fluid in the channels 20 to a voltage that is at or above the breakdown voltage of the dielectric.

With further reference to FIG. 20, the voltage detector 61v may be used to detect the voltage being applied to the ionizer assembly 10 and to provide an input to the control 62 to adjust the blower 21 according to the detected voltage. For example, a higher voltage ordinarily would cause increased heating and, thus, the desire for increased fluid flow provided by the blower. Still further, if the voltage detector 61v were instead a voltage setting device to limit the voltage drop across the ionizer assembly 10, that voltage setting could be provided to the control 62 to provide desired operation of the blower to provide fluid output according to the given voltage setting. Similarly, the frequency detector 61f may be used to detect frequency of the signal on the ionizer assembly 10, e.g., in an inductor ionizer resonant circuit or in some other circuit. Usually heating in an ionizer increases with increased frequency; and the blower 21 may be controlled by the control 62 according to either detected frequency and/or according to the set frequency (the latter if the frequency detector were used to set the frequency of the signal applied to the ionizer assembly 10). The occurrence of electric arcing in the ionizer assembly 10 would tend to create visible light. The light sensors 61p, 61u may sense the occurrence of such light and provide an input to the control 62 to cause it to operate the blower to increase flow through the channels 20 to reduce such electric arcing, and then the amount of such light likely would decrease, the decrease would be detected by the sensors 61p and/or 61u, and the control may accordingly operate the blower 21 to reduce flow output. The control 62 may be programmed, set adjusted, etc. to respond to inputs from the various sensors and/or by a user to adjust fluid flow to provide desired operation of the capacitor assembly as a capacitor or as an ionizer and to determine various operating parameters, e.g., voltage, frequency, cooling, operating temperatures, etc.

Briefly referring to FIGS. 21 and 22, an ionizer assembly 70, which is similar to the ionizer assemblies 10, 10', etc., described herein, includes a single honeycomb structure 12, electrodes 16 and top 11t and bottom 11b. Operation may be as was described above. The honeycomb structure 12 is used as a structural member by which the ionizer assembly 70 may be attached to another supporting mechanism 71 from which the ionizer assembly is mounted. For example, in FIG. 21 screws 72 and standoffs 73 may be used to space the honeycomb structure 12 from the supporting mechanism. Thus, the honeycomb structure 12 has adequate strength to provide support of the ionizer assembly from the supporting member 70. Being mountable as represented in FIG. 21, the ionizer assembly 10 can be placed in many different locations for various uses to provide the desired functions thereof. In FIG. 21 the honeycomb structure 12 is oriented laterally, e.g., generally parallel, with respect to the surface 74 of the wall 71 or other supporting mechanism. In FIG. 22 the honeycomb structure 12 is suspended vertically from the supporting mechanism 71 using a bracket 75 and screws 76. Although FIGS. 21 and 22 show only a single honeycomb structure 12 and associated electrodes 16, it will be appreciated that the ionizer assemblies shown may include a stack of ionizer subunits 11, 11', etc., as was described above; and the honeycomb structures thereof may provide the structural support member, as was described just above, for the ionizer assembly.

Although the invention is shown and described with respect to certain illustrated embodiments, equivalent alterations and modifications will be obvious to others skilled in the art as they read and thus come to understand this specification and the annexed drawings. Dimensions, materials, weights, etc., described herein are only exemplary and others may be used in the cases provided in accordance with the invention. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiment of the invention. In addition, while a particular feature of the invention may have been disclosed with respect to only one of the several embodiments, such features generally can be combined with one or more other features of any other embodiment as may be desired and advantageous for any given or particular application.

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of using honeycomb material having opposite surfaces and flow channels between the surfaces, comprising
    directing fluid flow through the channels while applying a voltage between the surfaces and across fluid flowing in the channels.

2. The method of claim 1, said applying a voltage comprising applying an alternating current (AC) voltage.

3. A method of using honeycomb material having opposite surfaces and fluid channels between the surfaces and having a fluid therein, comprising
    directing an alternating current (AC) voltage across fluid in a number of the channels to create electric arc or corona discharge in the fluid over a number of cycles of the AC voltage, whereby the AC voltage increases energy level of the fluid for a portion of a half cycle of the AC voltage and tends to move fluid particles in one direction, and the subsequent half cycle of the AC voltage tends to move fluid particles in the opposite direction, and whereby the change in direction of particles is an acceleration causing emission of photons.

4. An apparatus comprising a honeycomb structure of dielectric material having a number of flow channels therethrough, an electrode at a surface of the dielectric material responsive to electrical input to apply an electrical response alone or with regard to another electrode, the honeycomb structure having cohesive strength and rigidity to support itself and the electrode from in suspended relation.

5. The apparatus of claim 4, the honeycomb structure and electrode comprising part of an ionizer assembly and having sufficient cohesive strength and rigidity to support the ionizer assembly.

\* \* \* \* \*

UNITED STATES PATENT AND TRADEMARK OFFICE
CERTIFICATE OF CORRECTION

PATENT NO.        : 8,385,041 B2                                              Page 1 of 1
APPLICATION NO. : 12/524428
DATED             : February 26, 2013
INVENTOR(S)       : Paul R. Goudy, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

First Day of September, 2015

Michelle K. Lee
*Director of the United States Patent and Trademark Office*